United States Patent
Nakamura et al.

(10) Patent No.: US 10,803,825 B2
(45) Date of Patent: Oct. 13, 2020

(54) DISPLAY DEVICE AND DRIVE METHOD THEREFOR

(71) Applicant: Sharp Kabushiki Kaisha, Sakai, Osaka (JP)

(72) Inventors: Kazuo Nakamura, Sakai (JP); Masaaki Nishio, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/473,273

(22) PCT Filed: Jan. 24, 2018

(86) PCT No.: PCT/JP2018/002057
§ 371 (c)(1),
(2) Date: Jun. 25, 2019

(87) PCT Pub. No.: WO2018/143025
PCT Pub. Date: Aug. 9, 2018

(65) Prior Publication Data
US 2019/0318704 A1    Oct. 17, 2019

(30) Foreign Application Priority Data
Jan. 31, 2017 (JP) ................. 2017-015205

(51) Int. Cl.
*G09G 3/36*  (2006.01)
*G02F 1/1343*  (2006.01)

(52) U.S. Cl.
CPC ......... *G09G 3/3688* (2013.01); *G02F 1/1343* (2013.01); *G09G 3/3614* (2013.01); *G09G 2310/027* (2013.01)

(58) Field of Classification Search
None
See application file for complete search history.

(56) References Cited

U.S. PATENT DOCUMENTS

| 2001/0011983 A1 | 8/2001 | Shiraki et al. |
| 2006/0193002 A1* | 8/2006 | Satou .......... G09G 3/3688 358/1.15 |
| 2009/0207192 A1 | 8/2009 | Hashimoto |

FOREIGN PATENT DOCUMENTS

| JP | 11-052931 A | 2/1999 |
| JP | 2006-267999 A | 10/2006 |

(Continued)

OTHER PUBLICATIONS

Official Communication issued in International Patent Application No. PCT/JP2018/002057, dated Apr. 3, 2018.

*Primary Examiner* — Christopher J Kohlman
(74) *Attorney, Agent, or Firm* — Keating & Bennett, LLP

(57) ABSTRACT

There is provided a display device that can suppress occurrence of abnormal display caused by "differences in the settling time of data voltages" between the positions of source bus lines. An output circuit in a source driver is configured to selectively output data voltages and predetermined voltages (e.g., positive-polarity and negative-polarity gradation voltages corresponding to a gradation value at an intermediate level) other than the data voltages. A display control circuit is provided with a register that holds information identifying source bus lines whose charging rates are to be adjusted; and a charge sharing control unit that outputs charge sharing control signals based on the information held in the register. Based on the charge sharing control signals, the output circuit applies the predetermined voltages, for a certain period, to source bus lines whose charging rates are to be adjusted and then applies data voltages to the source bus lines.

15 Claims, 27 Drawing Sheets

(56) References Cited

FOREIGN PATENT DOCUMENTS

| JP | 2008-070404 A | 3/2008 |
| JP | 2009-192923 A | 8/2009 |
| JP | 2011-232780 A | 11/2011 |

\* cited by examiner

DISPLAY DEVICE AND DRIVE METHOD THEREFOR

TECHNICAL FIELD

The present invention relates to a display device, and more specifically, a display device having a display panel particularly in a shape other than a rectangle, and a drive method for the display device.

BACKGROUND ART

A liquid crystal display device generally includes a liquid crystal panel composed of two insulating glass substrates facing each other. One of the glass substrates is called an array substrate and the other is called a counter substrate. The array substrate has thin film transistors (TFTs), pixel electrodes, etc., formed thereon, and the counter substrate has a common electrode (counter electrode), color filters, etc., formed thereon. Such a conventional general liquid crystal panel has a rectangular display unit (display region). In the display unit, there are formed a plurality of source bus lines (video signal lines), a plurality of gate bus lines (scanning signal lines), and a plurality of pixel formation portions provided at the respective intersections of the plurality of source bus lines and the plurality of gate bus lines. Each pixel formation portion includes a TFT connected at its gate electrode to a gate bus line passing through a corresponding intersection, and connected at its source electrode to a source bus line passing through the intersection; a pixel electrode connected to a drain electrode of the TFT; a common electrode and an auxiliary capacitance electrode which are provided so as to be shared by the plurality of pixel formation portions; a liquid crystal capacitance formed by the pixel electrode and the common electrode; and an auxiliary capacitance formed by the pixel electrode and the auxiliary capacitance electrode. By the liquid crystal capacitance and the auxiliary capacitance, a pixel capacitance is formed. In a configuration such as that described above, a pixel capacitance is charged based on a data voltage (video signal) which is received by the source electrode of a TFT from a source bus line when the gate electrode of the TFT receives an active scanning signal from a gate bus line. By charging the pixel capacitances in the plurality of pixel formation portions in this manner, a desired image is displayed on the display unit.

In a liquid crystal display device such as that described above, luminance non-uniformity may occur due to, for example, the disposition of light sources forming a backlight. Hence, conventionally, in order to suppress the occurrence of luminance non-uniformity, a data voltage corresponding to a target display gradation is corrected and the corrected data voltage is applied to a source bus line. An invention of a liquid crystal display device that makes such a correction is disclosed in, for example, Japanese Laid-Open Patent Publication No. 2008-70404.

PRIOR ART DOCUMENT

Patent Document

[Patent Document 1] Japanese Laid-Open Patent Publication No. 2008-70404

SUMMARY OF THE INVENTION

Problems to be Solved by the Invention

As described above, the conventional general liquid crystal panel has a rectangular display unit (display region). However, in recent years, the development of liquid crystal display devices including display units in shapes other than a rectangle, such as liquid crystal display devices for clock application and liquid crystal display devices for in-vehicle application, has progressed. Note that in the following a display device including a display unit in a shape other than a rectangle and including a display panel whose outer shape is also other than a rectangle is referred to as an "oddly-shaped display".

Meanwhile, in the oddly-shaped display, in some cases, despite the fact that a target display image is so-called a "solid image" (an image that provides the same color and the same gradation on the entire display unit), the actual display image is an image called vertical gradation (an image whose gradation gradually changes in a lateral direction). Such abnormal display will be described with reference to FIGS. 35 and 36.

FIG. 35 is a diagram schematically showing source bus lines, a display unit, and a source driver of an oddly-shaped display having a circular display unit. As can be grasped from FIG. 35, in the oddly-shaped display, the length of the source bus line varies depending on the position. For example, the length of a source bus line provided with reference character 91 (a source bus line arranged at an edge portion of the display unit) is relatively short, whereas the length of a source bus line provided with reference character 92 (a source bus line arranged at a position close to a central portion of the display unit) is relatively long. In addition, in the region in the display unit, each source bus line is connected to the above-described pixel formation portions. That is, the source bus line provided with reference character 91 is connected to a comparatively small number of pixel formation portions, whereas the source bus line provided with reference character 92 is connected to a comparatively large number of pixel formation portions. By the above, the load on the source bus line provided with reference character 91 is relatively small, and the load on the source bus line provided with reference character 92 is relatively large. Hence, for example, in the source bus line provided with reference character 91, a signal waveform of a data voltage changes as indicated by reference character Va in FIG. 36, whereas in the source bus line provided with reference character 92, a signal waveform of a data voltage changes as indicated by reference character Vb in FIG. 36.

It can be grasped from FIG. 36 that a source bus line arranged at a position closer to the central portion of the display unit has longer settling time (the time taken for a voltage value to fall within an allowable range of a target value) of the data voltage (i.e., slower response speed). Such differences in the settling time of the data voltages cause differences in charging rate between positions (positions in the lateral direction), and as a result, an image called vertical gradation is displayed (despite the fact that a target display image is a solid image). That is, abnormal display occurs.

Note that in the invention disclosed in Japanese Laid-Open Patent Publication No. 2008-70404, a data voltage is corrected by correcting the values of RGB signals (image data). Therefore, regarding a data voltage, a correction cannot be made at a level corresponding to luminance less than one gradation. Therefore, even if the invention disclosed in Japanese Laid-Open Patent Publication No. 2008-70404 is applied to an oddly-shaped display, the occurrence of abnormal display such as that described above cannot be ideally suppressed.

An object of the present invention is therefore to provide a display device that can suppress the occurrence of abnormal display caused by the "differences in the settling time of data voltages (to be applied to source bus lines)" between the positions of the source bus lines (video signal lines).

Means for Solving the Problems

A first aspect of the present invention is directed to a display device that has a display unit in which a plurality of video signal lines are arranged, and displays an image created based on input image data on the display unit, the display device including:

a video signal line drive circuit including an output circuit configured to apply data voltages generated based on the input image data to the plurality of video signal lines; and an output control unit configured to control operation of the output circuit such that application start timing of desired data voltages to control-target video signal lines is delayed relative to application start timing of desired data voltages to video signal lines other than the control-target video signal lines, the control-target video signal lines being specified video signal lines among the plurality of video signal lines.

According to a second aspect of the present invention, in the first aspect of the present invention, a data voltage application period includes an adjustment period and an all-line charging period, the data voltage application period being a period during which application of the data voltages to video signal lines is performed, and the all-line charging period being a period following the adjustment period, the output circuit is configured to selectively output the data voltages and a predetermined voltage other than the data voltages, and the output control unit controls the operation of the output circuit such that during the adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

According to a third aspect of the present invention, in the second aspect of the present invention, the control-target video signal lines are divided into N (N is an integer greater than or equal to 2) groups, as the adjustment period, N adjustment periods having same start timing and different end timings are prepared for the N groups, respectively, and the output control unit controls the operation of the output circuit such that the predetermined voltage is applied to control-target video signal lines included in any group during an adjustment period corresponding to relevant group.

According to a fourth aspect of the present invention, in the second aspect of the present invention, the video signal line drive circuit further includes a gradation voltage generator circuit configured to generate a gradation voltage group including a plurality of gradation voltages from which the data voltages are originated, and one or more gradation voltages included in the gradation voltage group are provided as the predetermined voltage to the output circuit from the gradation voltage generator circuit.

According to a fifth aspect of the present invention, in the first aspect of the present invention, a data voltage application period includes an adjustment period and an all-line charging period, the data voltage application period being a period during which application of the data voltages to video signal lines is performed, and the all-line charging period being a period following the adjustment period, and the output control unit controls the operation of the output circuit such that during the adjustment period the desired data voltages are applied to the video signal lines other than the control-target video signal lines and voltages applied to the control-target video signal lines immediately before starting the adjustment period are applied as they are to the control-target video signal lines, and during the all-line charging period the desired data voltages are applied to all of the plurality of video signal lines.

According to a sixth aspect of the present invention, in the fifth aspect of the present invention, the control-target video signal lines are divided into N (N is an integer greater than or equal to 2) groups, as the adjustment period, N adjustment periods having same start timing and different end timings are prepared for the N groups, respectively, and the output control unit controls the operation of the output circuit such that to control-target video signal lines included in any group, during an adjustment period corresponding to relevant group, the voltages applied to the control-target video signal lines immediately before starting the adjustment period are applied as they are.

According to a seventh aspect of the present invention, in the first aspect of the present invention, a data voltage application period includes a first adjustment period, a second adjustment period, and an all-line charging period, the data voltage application period being a period during which application of the data voltages to video signal lines is performed, the second adjustment period being a period following the first adjustment period, and the all-line charging period being a period following the second adjustment period, the output circuit is configured to selectively output the data voltages and a predetermined voltage other than the data voltages, and the output control unit controls the operation of the output circuit such that during the first adjustment period the desired data voltages are applied to the video signal lines other than the control-target video signal lines and voltages applied to the control-target video signal lines immediately before starting the first adjustment period are applied as they are to the control-target video signal lines, during the second adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

According to an eighth aspect of the present invention, in the first aspect of the present invention, the display device further includes a register configured to hold information identifying the control-target video signal lines, wherein the output control unit controls the operation of the output circuit based on the information held in the register.

According to a ninth aspect of the present invention, in the first aspect of the present invention, the display unit has a non-rectangular shape, and video signal lines with a comparatively short length among the plurality of video signal lines are specified as the control-target video signal lines.

According to a tenth aspect of the present invention, in the first aspect of the present invention, the display unit is logically divided into a plurality of areas, and the output control unit controls the operation of the output circuit such that an amount of delay in application start timing of the desired data voltages is larger for an area with smaller load on video signal lines.

An eleventh aspect of the present invention is directed to a drive method for a display device that has a display unit in which a plurality of video signal lines are arranged, and displays an image created based on input image data on the display unit, the drive method comprising:

an outputting step of applying, by an output circuit, data voltages generated based on the input image data to the plurality of video signal lines; and an output controlling step of controlling operation of the output circuit such that application start timing of desired data voltages to control-target video signal lines is delayed relative to application start timing of desired data voltages to video signal lines other than the control-target video signal lines, the control-target video signal lines being specified video signal lines among the plurality of video signal lines.

Effects of the Invention

According to the first aspect of the present invention, data voltages are applied to control-target video signal lines at timing delayed relative to a video signal line other than the control-target video signal lines. Hence, by specifying video signal lines with small load as control-target video signal lines, the settling time of data voltages on the video signal lines with small load can be made longer than the original settling time. By this, differences in the settling time of data voltages between the plurality of video signal lines are reduced. As a result, a uniform charging rate is achieved across the entire display unit, suppressing the occurrence of abnormal display. As described above, a display device is implemented that can suppress the occurrence of abnormal display caused by the "differences in the settling time of data voltages (to be applied to the video signal lines)" between the positions of the video signal lines.

According to the second aspect of the present invention, the output circuit in the video signal line drive circuit is configured to selectively output data voltages and a predetermined voltage other than the data voltages. By the output control unit controlling the operation of the output circuit, during an adjustment period, the predetermined voltage other than the data voltages is applied to the control-target video signal lines. Therefore, by specifying video signal lines with small load as control-target video signal lines, the settling time of data voltages on the video signal lines with small load can be made longer than the original settling time. By this, the same effects as those obtained in the first aspect of the present invention can be obtained.

According to the third aspect of the present invention, it becomes possible to make the length of an adjustment period different between groups, the adjustment period being a period during which the predetermined voltage other than the data voltages is applied to the control-target video signal lines. Hence, by dividing the control-target video signal lines into a plurality of groups as appropriate depending on the shape of the display unit, etc., it becomes possible to more minutely adjust the charging rates. By this, a display device is implemented that can more effectively suppress the occurrence of abnormal display caused by the "differences in the settling time of data voltages (to be applied to the video signal lines)" between the positions of the video signal lines.

According to the fourth aspect of the present invention, as the predetermined voltage to be applied to the control-target video signal lines during the adjustment period, a gradation voltage included in a gradation voltage group generated by the gradation voltage generator circuit is used. Hence, there is no need to provide a special voltage to the output circuit.

According to the fifth aspect of the present invention, by the output control unit controlling the operation of the output circuit, during an adjustment period, voltages having been applied to control-target video signal lines immediately before starting the adjustment period are applied as they are to the control-target video signal lines. Therefore, by specifying video signal lines with small load as control-target video signal lines, the settling time of data voltages on the video signal lines with small load can be made longer than the original settling time. By this, the same effects as those obtained in the first aspect of the present invention can be obtained.

According to the sixth aspect of the present invention, due to the same reason as in the third aspect of the present invention, a display device is implemented that can more effectively suppress the occurrence of abnormal display caused by the "differences in the settling time of data voltages (to be applied to the video signal lines)" between the positions of the video signal lines.

According to the seventh aspect of the present invention, the output circuit in the video signal line drive circuit is configured to selectively output data voltages and a predetermined voltage other than the data voltages. By the output control unit controlling the operation of the output circuit, during a first adjustment period, voltages having been applied to control-target video signal lines immediately before starting the first adjustment period are applied as they are to the control-target video signal line. In addition, during a second adjustment period, the predetermined voltage other than the data voltages is applied to the control-target video signal lines. Therefore, by specifying video signal lines with small load as control-target video signal lines, the settling time of data voltages on the video signal lines with small load can be effectively made longer than the original settling time. In addition, since two types of control are performed, it becomes possible to more minutely adjust the charging rates. By the above, a display device is implemented that can more effectively suppress the occurrence of abnormal display caused by the "differences in the settling time of data voltages (to be applied to the video signal lines)" between the positions of the video signal lines.

According to the eighth aspect of the present invention, by appropriately specifying video signal lines whose charging rates are to be adjusted by the register, the same effects as those obtained in the first aspect of the present invention can be obtained.

According to the ninth aspect of the present invention, in a display device including a non-rectangular display unit, a uniform charging rate is achieved across the entire display unit, suppressing the occurrence of abnormal display.

According to the tenth aspect of the present invention, the smaller the load on a video signal line, the longer the settling time of a data voltage on the video signal line than the original settling time. By this, differences in the settling time of data voltages between the plurality of video signal lines are effectively reduced. As a result, a uniform charging rate is achieved across the entire display unit, effectively suppressing the occurrence of abnormal display.

According to the eleventh aspect of the present invention, the same effects as those obtained in the first aspect of the present invention can be provided in an invention of a drive method for a display device.

MODES FOR CARRYING OUT THE INVENTION

Embodiments of the present invention will be described below with reference to the accompanying drawings.

1. First Embodiment

1.1 Overall Configuration and Overview of Operation

Figure 2:
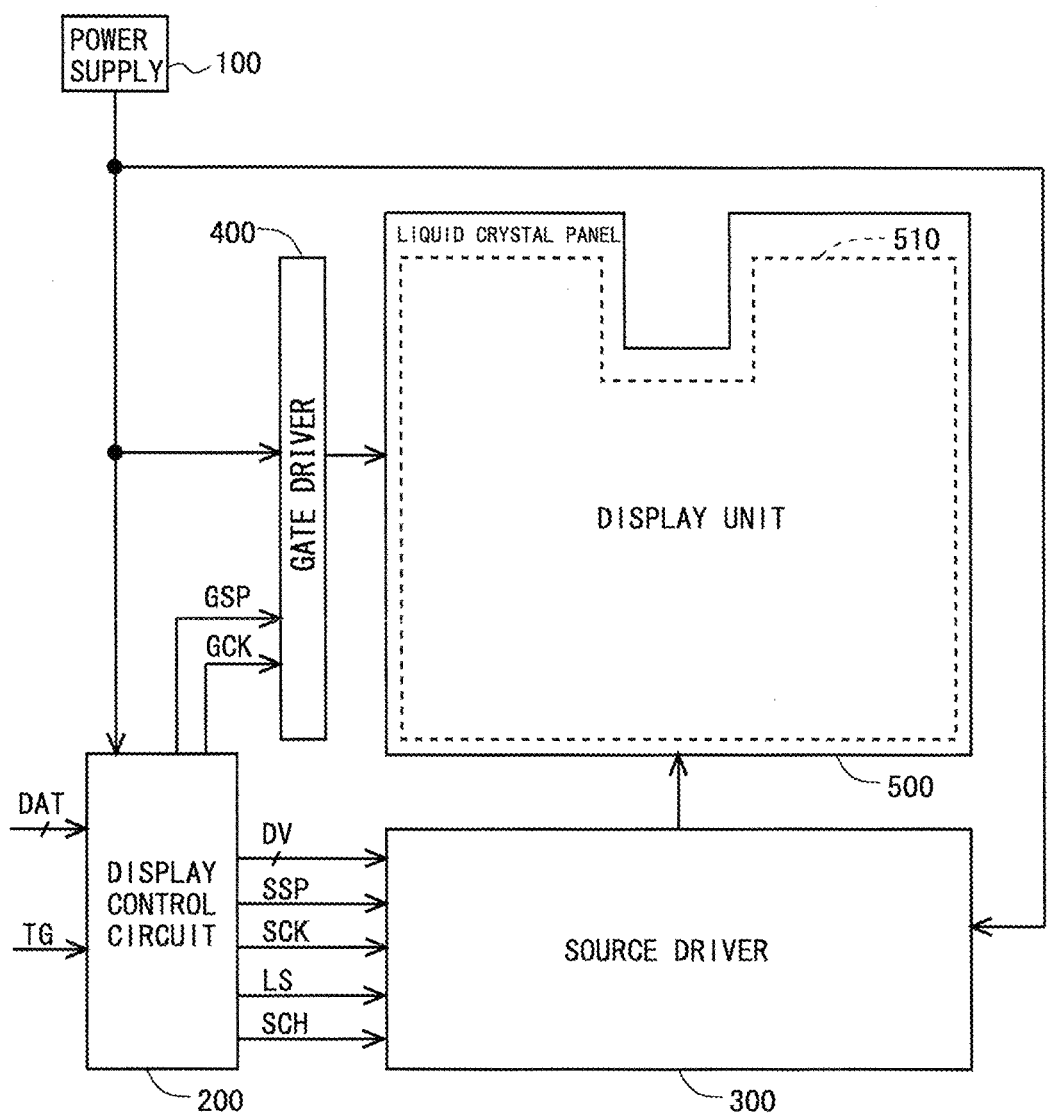
FIG. 2 is a block diagram showing an overall configuration of a liquid crystal display device according to the first embodiment.

FIG. 2 is a block diagram showing an overall configuration of a liquid crystal display device according to a first embodiment of the present invention. As shown in FIG. 2, the liquid crystal display device includes a power supply 100, a display control circuit 200, a source driver (video signal line drive circuit) 300, a gate driver (scanning signal line drive circuit) 400, and a liquid crystal panel 500. The liquid crystal panel 500 includes a display unit (display region) 510 that displays an image. The liquid crystal panel 500 and the display unit 510 have a right-angled U-shape as viewed from the top. That is, the liquid crystal display device according to the present embodiment is an oddly-shaped display. Note that the gate driver 400 or the source driver 300 or both may be provided in the liquid crystal panel 500.

Figure 3:
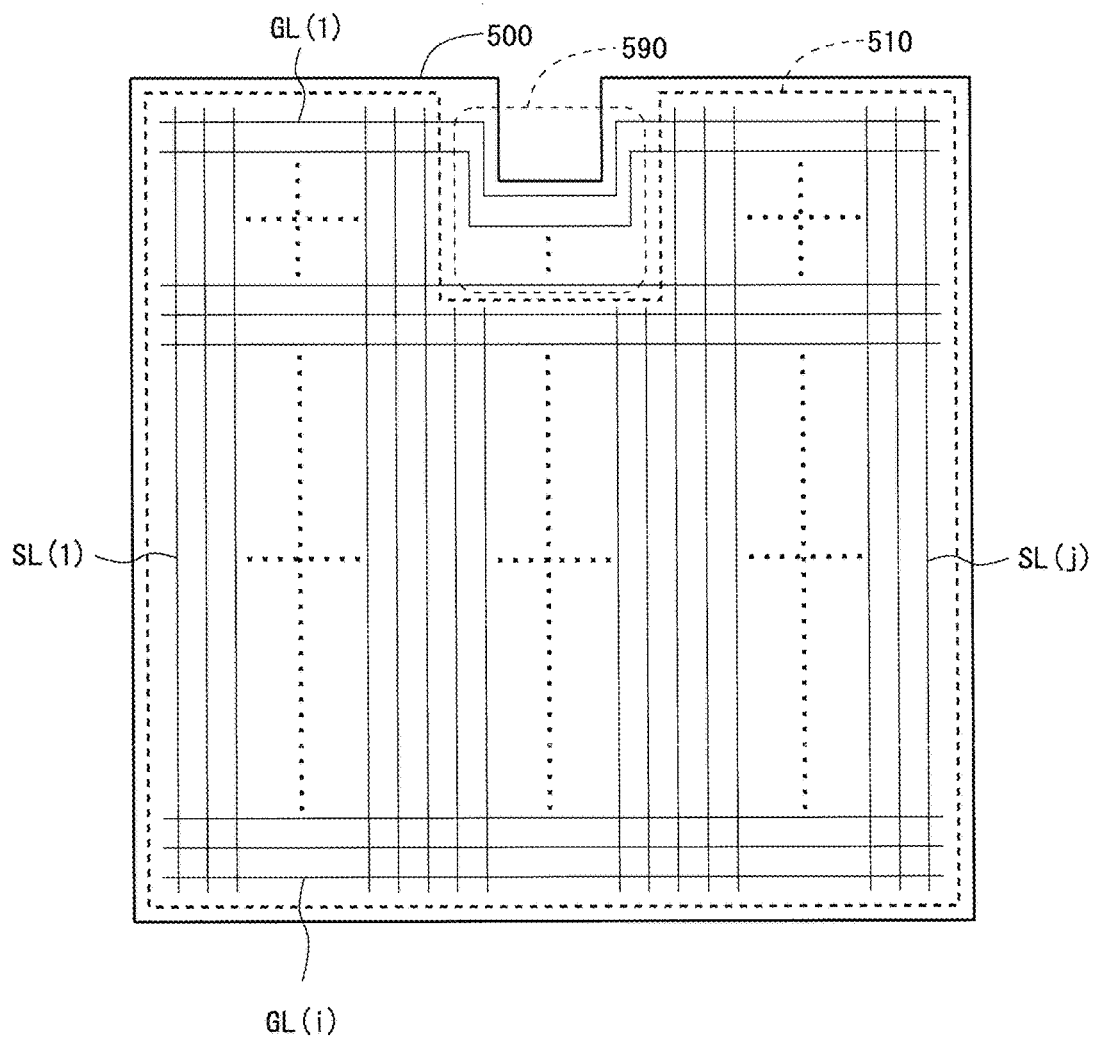
FIG. 3 is a diagram for describing a display unit in the first embodiment.

FIG. 3 is a diagram for describing the display unit 510 of the present embodiment. In the display unit 510, as shown in FIG. 3, there are arranged a plurality of (j) source bus lines (video signal lines) SL(1) to SL(j) and a plurality of (i) gate bus lines (scanning signal lines) GL(1) to GL(i). For example, j is 1920 and i is 1080. In addition, in the region in the display unit 510, pixel formation portions (not shown in FIG. 3) each forming a pixel are provided near the intersections of the source bus lines SL and the gate bus lines GL. Note that in a part of the region (a region indicated by reference character 590 in FIG. 3), gate bus lines GL are arranged in a region outside the display unit 510, i.e., a picture-frame region.

Meanwhile, when taking a look at the lengths of the source bus lines SL, source bus lines SL arranged in a region indicated by reference character Ar1 in FIG. 4 (hereinafter, referred to as the "area Ar1") and a region indicated by reference character Ar3 in FIG. 4 (hereinafter, referred to as the "area Ar3") are longer than source bus lines SL arranged in a region indicated by reference character Ar2 in FIG. 4 (hereinafter, referred to as the "area Ar2"). Therefore, the load on the source bus lines SL arranged in the area Ar2 is relatively small, and the load on the source bus lines SL arranged in the area Ar1 and the area Ar3 is relatively large. Hence, if the source bus lines SL are driven in a conventional manner, then due to the occurrence of differences in charging rate caused by differences in the settling time of data voltages, abnormal display may occur. Hence, in the present embodiment, in order to achieve a uniform charging rate across the entire display unit 510, an adjustment of the charging rate by charge sharing control is made for the source bus lines SL arranged in the area Ar2, the detailed description of which will be made later.

Figure 5:
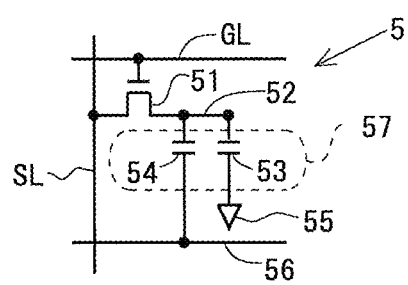
FIG. 5 is a diagram showing a configuration of a pixel formation portion in the first embodiment.

FIG. 5 is a circuit diagram showing a configuration of a pixel formation portion 5. The pixel formation portion 5 includes a thin film transistor (TFT) 51 connected at its gate electrode to a gate bus line GL passing through a corresponding intersection, and connected at its source electrode to a source bus line SL passing through the intersection; a pixel electrode 52 connected to a drain electrode of the TFT 51; a common electrode 55 and an auxiliary capacitance electrode 56 which are provided so as to be shared by the above-described plurality of pixel formation portions 5; a liquid crystal capacitance 53 formed by the pixel electrode 52 and the common electrode 55; and an auxiliary capacitance 54 formed by the pixel electrode 52 and the auxiliary capacitance electrode 56. By the liquid crystal capacitance 53 and the auxiliary capacitance 54, a pixel capacitance 57 is formed. Note that the configuration of the pixel formation portion 5 is not limited to that shown in FIG. 5. For example, a configuration in which the auxiliary capacitance 54 and the auxiliary capacitance electrode 56 are not provided can also be adopted.

The type of the TFTs 51 in the display unit 510 is not particularly limited. For example, amorphous silicon TFTs, low temperature poly silicon (LTPS)-TFTs, oxide TFTs (TFTs containing an oxide semiconductor as a channel layer), etc., can be adopted as the TFTs 51 in the display unit 510. For the oxide TFTs, for example, TFTs whose channel layers are formed from indium gallium zinc oxide (In—Ga—Zn—O) which is an oxide semiconductor having indium (In), gallium (Ga), zinc (Zn), and oxygen (O) as the main components can be adopted.

Figure 6:
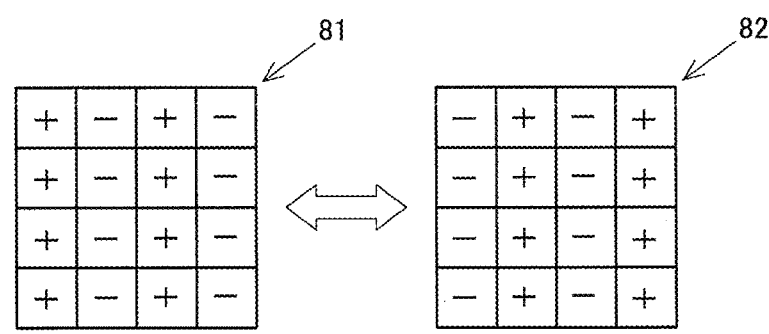
FIG. 6 is a diagram showing polarity patterns for a case of adopting a column-reversal driving system, regarding the first embodiment.

In addition, the liquid crystal display device according to the present embodiment adopts a column-reversal driving system as a polarity reversal system. The column-reversal driving system is a driving system in which the polarities of pixel voltages are reversed every frame and the polarities of pixels adjacent to each other in a lateral (horizontal) direction are also reversed in each frame. When such a column-reversal driving system is adopted, a polarity pattern such as that indicated by reference character 81 in FIG. 6 and a polarity pattern such as that indicated by reference character 82 in FIG. 6 alternately appear every frame. As can be grasped from FIG. 6, in all source bus lines SL in the odd-numbered columns, the polarities of data voltages (video signals) change in the same manner, and in all source bus lines SL in the even-numbered columns, the polarities of data voltages change in the same manner. In addition, the polarities of data voltages are always opposite between the source bus lines SL in the odd-numbered columns and the source bus lines SL in the even-numbered columns. In the present embodiment, such a column-reversal driving system is adopted. Note, however, that the present invention is not limited thereto, and other polarity reversal systems than the column-reversal driving system can also be adopted.

An overview of the operation of the components shown in FIG. 2 will be described below. The power supply 100 supplies a power supply voltage to the display control circuit 200, the source driver 300, and the gate driver 400. The display control circuit 200 receives an image signal (input image data) DAT and a timing signal group TG such as a horizontal synchronizing signal and a vertical synchronizing signal, which are transmitted from an external source (a host, etc.), and outputs digital video signals DV, a source start pulse signal SSP, a source clock signal SCK, a latch strobe signal LS, and charge sharing control signals SCH for controlling the operation of the source driver 300, and a gate start pulse signal GSP and a gate clock signal GCK for controlling the operation of the gate driver 400.

The source driver 300 receives the digital video signals DV, the source start pulse signal SSP, the source clock signal SCK, the latch strobe signal LS, and the charge sharing control signals SCH which are outputted from the display control circuit 200, and applies data voltages corresponding to display gradations indicated by the digital video signals DV to the source bus lines SL(1) to SL(j). Note that a detailed description of the source driver 300 will be made later.

The gate driver 400 repeats the application of active scanning signals to the respective gate bus lines GL(1) to GL(i), based on the gate start pulse signal GSP and the gate clock signal GCK which are outputted from the display control circuit 200, with one vertical scanning period as a cycle.

In the above-described manner, the data voltages are applied to the source bus lines SL(1) to SL(j), respectively, and the scanning signals are applied to the gate bus lines GL(1) to GL(i), respectively, by which an image created based on the image signal DAT transmitted from the external source is displayed on the display unit 510.

1.2 Configuration for Performing Charge Sharing Control

Figure 1:
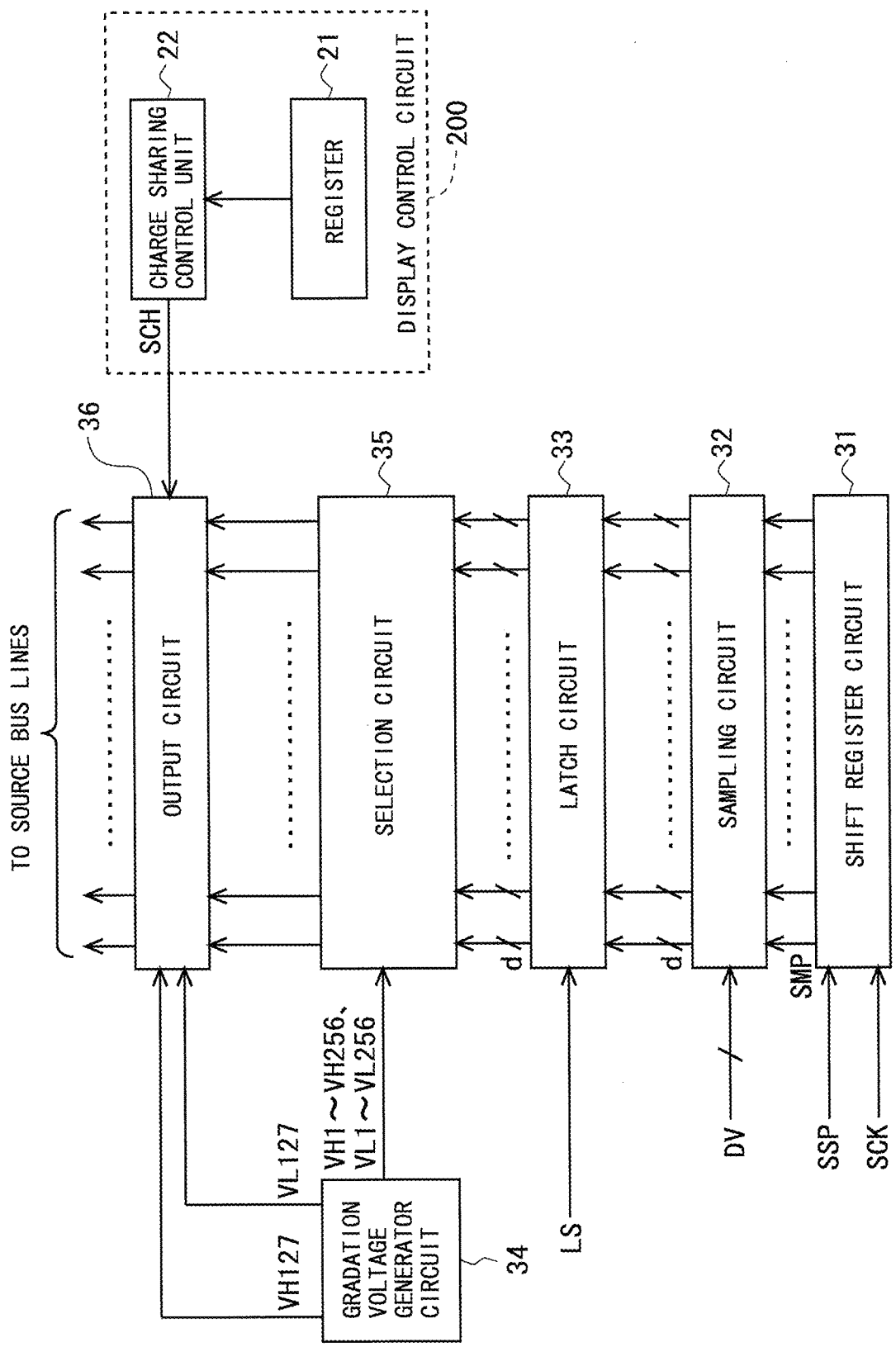
FIG. 1 is a block diagram showing a configuration for performing charge sharing control (a configuration of a source driver and a configuration of a part of a display control circuit) in a first embodiment of the present invention.

FIG. 1 is a block diagram showing a configuration for performing charge sharing control (a configuration of the source driver 300 and a configuration of a part of the display control circuit 200). Note that the charge sharing control used here refers to control in which an electrical connection between an output amplifier (an amplifier that outputs a data voltage to a source bus line SL) in the source driver 300 and the source bus line SL is disconnected to temporarily apply a predetermined voltage different from the data voltage to the source bus line SL. As shown in FIG. 1, the source driver 300 is composed of a shift register circuit 31, a sampling circuit 32, a latch circuit 33, a gradation voltage generator circuit 34, a selection circuit 35, and an output circuit 36. The display control circuit 200 includes a register 21 and a charge sharing control unit 22 as components for controlling the operation of the output circuit 36 in the source driver 300. The operation of the components shown in FIG. 1 will be described below.

A source start pulse signal SSP and a source clock signal SCK are inputted to the shift register circuit 31. The shift register circuit 31 transfers a pulse included in the source start pulse signal SSP sequentially from an input terminal to an output terminal based on the source clock signal SCK. Sampling pulses SMP for the respective source bus lines SL(1) to SL(j) are sequentially outputted from the shift register circuit 31 based on the transfer of the pulse, and the sampling pulses SMP are sequentially inputted to the sampling circuit 32.

The sampling circuit 32 samples digital video signals DV transmitted from the display control circuit 200, at timing of the sampling pulses SMP outputted from the shift register circuit 31, and outputs the sampled digital video signals DV as internal image signals d. The latch circuit 33 takes in the internal image signals d outputted from the sampling circuit 32, at timing of a pulse of a latch strobe signal LS, and outputs the internal image signals d.

The gradation voltage generator circuit 34 generates voltages (gradation voltages) VH1 to VH256 and VL1 to VL256 corresponding to 256 gradation levels for each of the positive and negative polarities based on a plurality of reference voltages provided from, for example, the power supply 100, and outputs the voltages VH1 to VH256 and VL1 to VL256 as a gradation voltage group. The gradation voltage group VH1 to VH256 and VL1 to VL256 is provided to the selection circuit 35. In addition, in the present embodiment, positive-polarity and negative-polarity gradation voltages VH127 and VL127 corresponding to the gradation value "127" (a gradation value at an intermediate level) are also provided to the output circuit 36. Note that the number of gradation levels is not limited to 256 and may be, for example, 64, 512, or 1024.

The selection circuit 35 selects any of the voltages included in the gradation voltage group VH1 to VH256 and VL1 to VL256 outputted from the gradation voltage generator circuit 34, based on the internal image signals d outputted from the latch circuit 33, and outputs the selected voltages. The voltages outputted from the selection circuit 35 are inputted to the output circuit 36.

The output circuit 36 performs impedance transformation on the voltages outputted from the selection circuit 35, and outputs the transformed voltages as data voltages to the source bus lines SL. At that time, charge sharing control is performed based on charge sharing control signals SCH so as to achieve a uniform charging rate across the entire display unit 510. Note that a detailed description of the charge sharing control will be made later.

In the register 21, there is stored in advance information that identifies source bus lines SL (or pixels or an area) whose charging rates are to be adjusted by charge sharing control. In the present embodiment, since, as described above, the source bus lines SL arranged in the area Ar2 (see FIG. 4) are to be adjusted in their charging rates, information identifying the source bus lines SL is stored in advance in the register 21. As such, of the plurality of source bus lines SL arranged in the display unit 510, source bus lines SL with a comparatively short length are specified as source bus lines (control-target video signal lines) whose charging rates are to be adjusted.

The charge sharing control unit 22 outputs charge sharing control signals SCH based on the information stored in the register 21 so that the output circuit 36 performs desired charge sharing control. In other words, the charge sharing control unit 22 controls the operation of the output circuit 36 such that by charge sharing control, the application start timing of desired data voltages to the source bus lines SL whose charging rates are to be adjusted among the plurality of source bus lines SL arranged in the display unit 510 is delayed relative to the application start timing of desired data voltages to source bus lines SL whose charging rates are not to be adjusted. Note that the charge sharing control signals SCH are signals for controlling the on/off state of each switch in the output circuit 36 and the operation of the output amplifiers in the output circuit 36, and include a plurality of signals. In the present embodiment, an output control unit is implemented by the charge sharing control unit 22.

Meanwhile, in the present embodiment, information identifying the source bus lines SL whose charging rates are to be adjusted is held in the register 21 in the display control circuit 200. However, the present invention is not limited thereto. The configuration may be such that the information is, for example, stored in a nonvolatile memory in the display control circuit 200, and when the device starts up, the information is read from the nonvolatile memory and is loaded into the register 21. In addition, every time the device starts up, the information may be received from an external source (a host, etc.) and loaded into the register 21. Furthermore, the configuration may be such that the information is stored in an external device such as an EEPROM and the display control circuit 200 reads the information from the external device and loads the information into the register 21. As described above, how to hold information identifying the source bus lines SL whose charging rates are to be adjusted is not particularly limited. The same also applies to a second embodiment and a third embodiment which will be described later.

Figure 7:
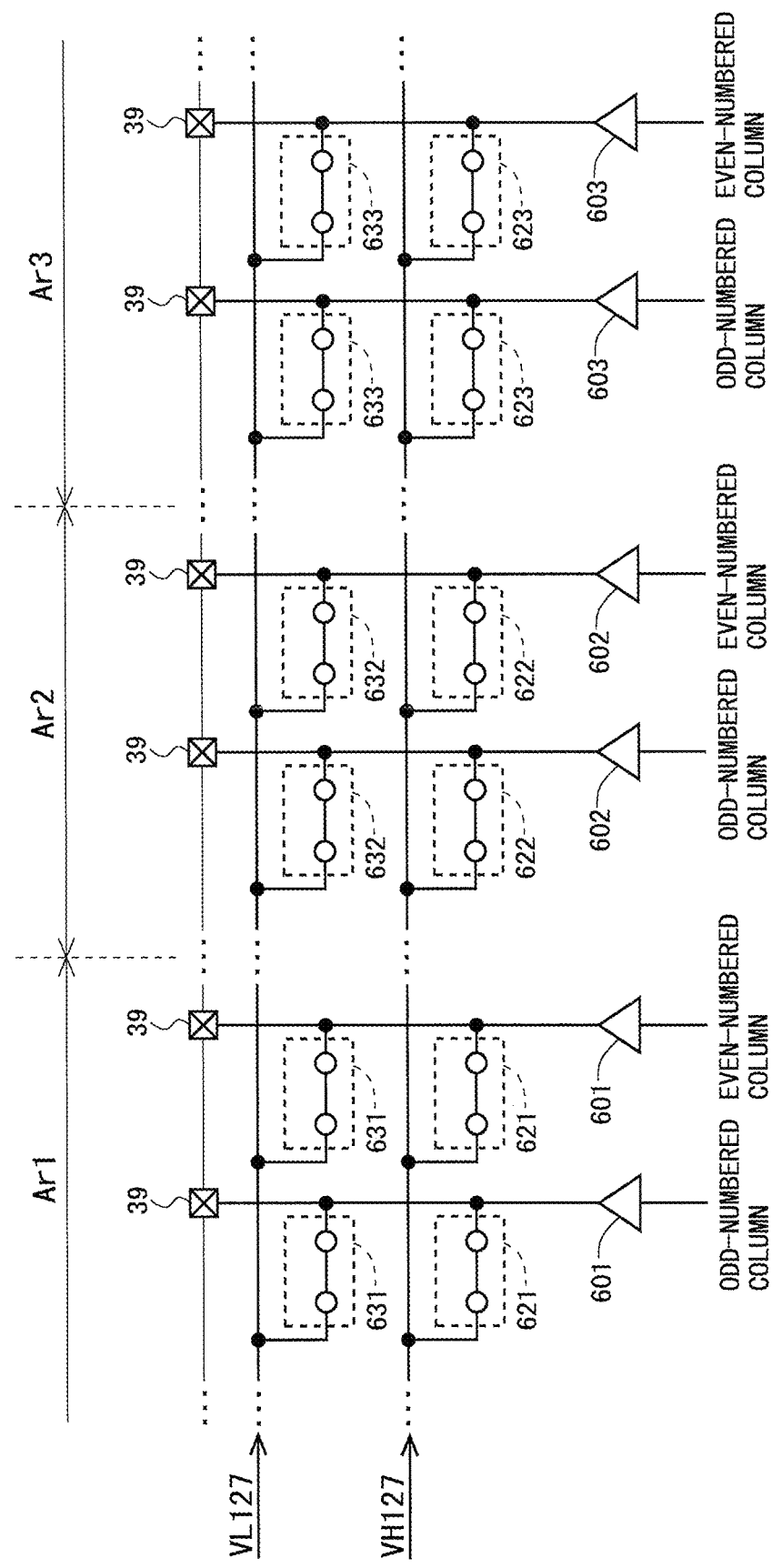
FIG. 7 is a circuit diagram showing a configuration of an output circuit in a source driver in the first embodiment.

Next, with reference to FIG. 7, a configuration of the output circuit 36 in the source driver 300 will be described. Note that FIG. 7 only shows components provided for two source bus lines SL (a source bus line SL in an odd-numbered column and a source bus line SL in an even-numbered column) for each of the areas AR1 to Ar3. As described above, the gradation voltages VH127 and VL127 corresponding to the gradation value "127" are provided to the output circuit 36 from the gradation voltage generator circuit 34. As shown in FIG. 7, the output circuit 36 includes output amplifiers 601 to 603 that output data voltages; switches 621 to 623 that control the application of the gradation voltage VH127 to the source bus lines SL; and switches 631 to 633 that control the application of the gradation voltage VL127 to the source bus lines SL. Note that in FIG. 7, output terminals are indicated by reference character 39. To the output terminals 39 are connected the source bus lines SL arranged external to the output circuit 36.

Figure 11:
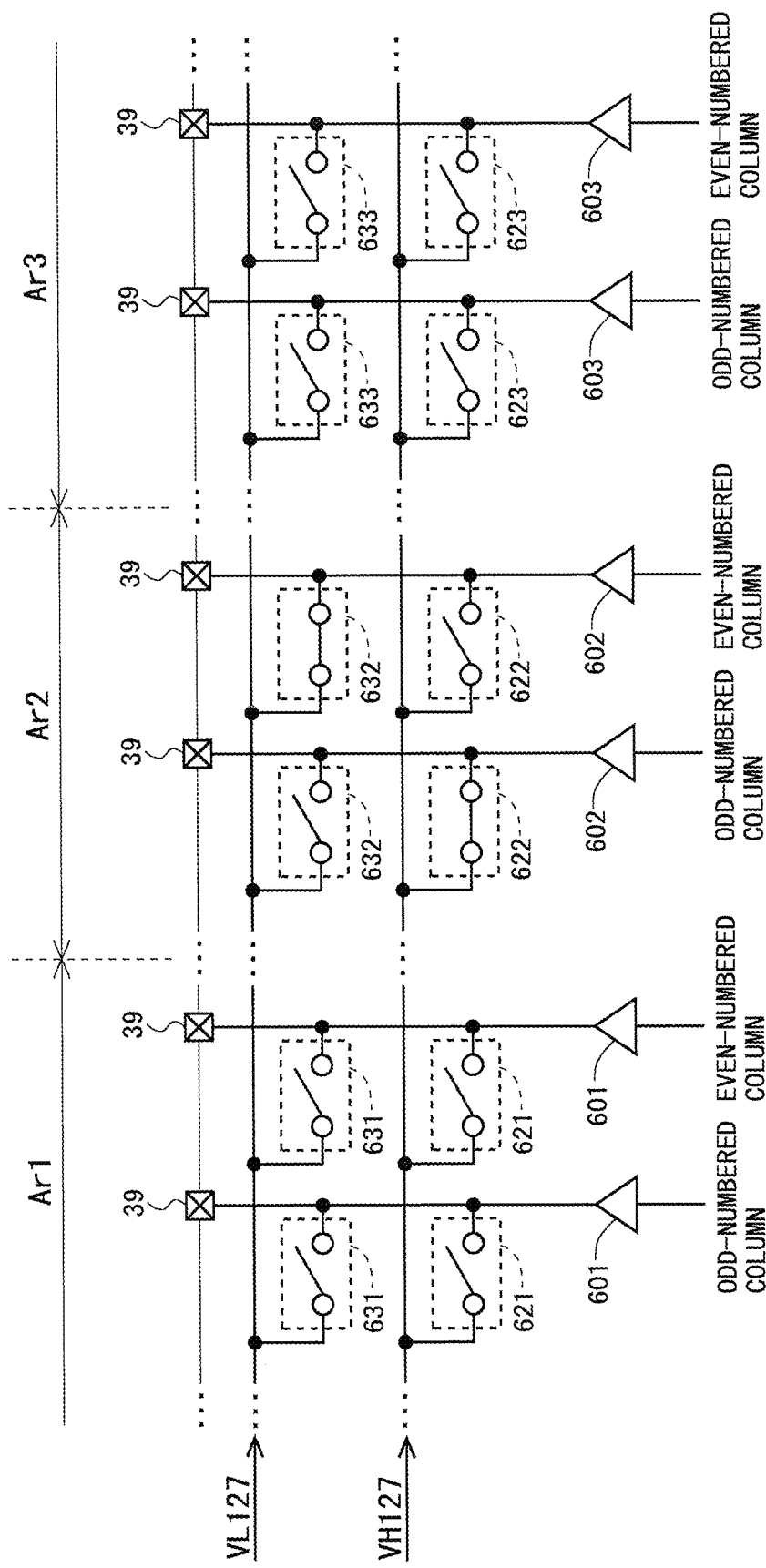
FIG. 11 is a diagram showing the on/off state of each switch in the output circuit during an adjustment period in a given frame in the first embodiment.

Note that in general the output circuit 36 is provided with an ESD protection element for preventing destruction of circuit elements or erroneous operation of the circuit which are caused by a discharge of static electricity, but in FIG. 7 the depiction of the ESD protection element is omitted (in FIG. 11, etc., too).

Regarding FIG. 7, when taking a look at, for example, the components provided for the source bus lines SL arranged in the area Ar1, the on/off states of the switches 621 and 631 are controlled by charge sharing control signals SCH transmitted from the charge sharing control unit 22 (see FIG. 1), such that when data voltages are to be applied to the source bus lines SL, all switches 621 and 631 go into an off state, when the gradation voltage VH127 is to be applied to the source bus lines SL, only the switches 621 go into an on state, and when the gradation voltage VL127 is to be applied to the source bus lines SL, only the switches 631 go into an on state. In addition, when the gradation voltage VH127 or the gradation voltage VL127 is to be applied to the source bus lines SL, the operation of the output amplifiers 601 is stopped by the charge sharing control signals SCH (at this time, the outputs of the output amplifiers 601 are set to high impedance). The above-described respects are also the same for the components provided for the source bus lines SL arranged in the area Ar2 and the area Ar3.

Figure 8:
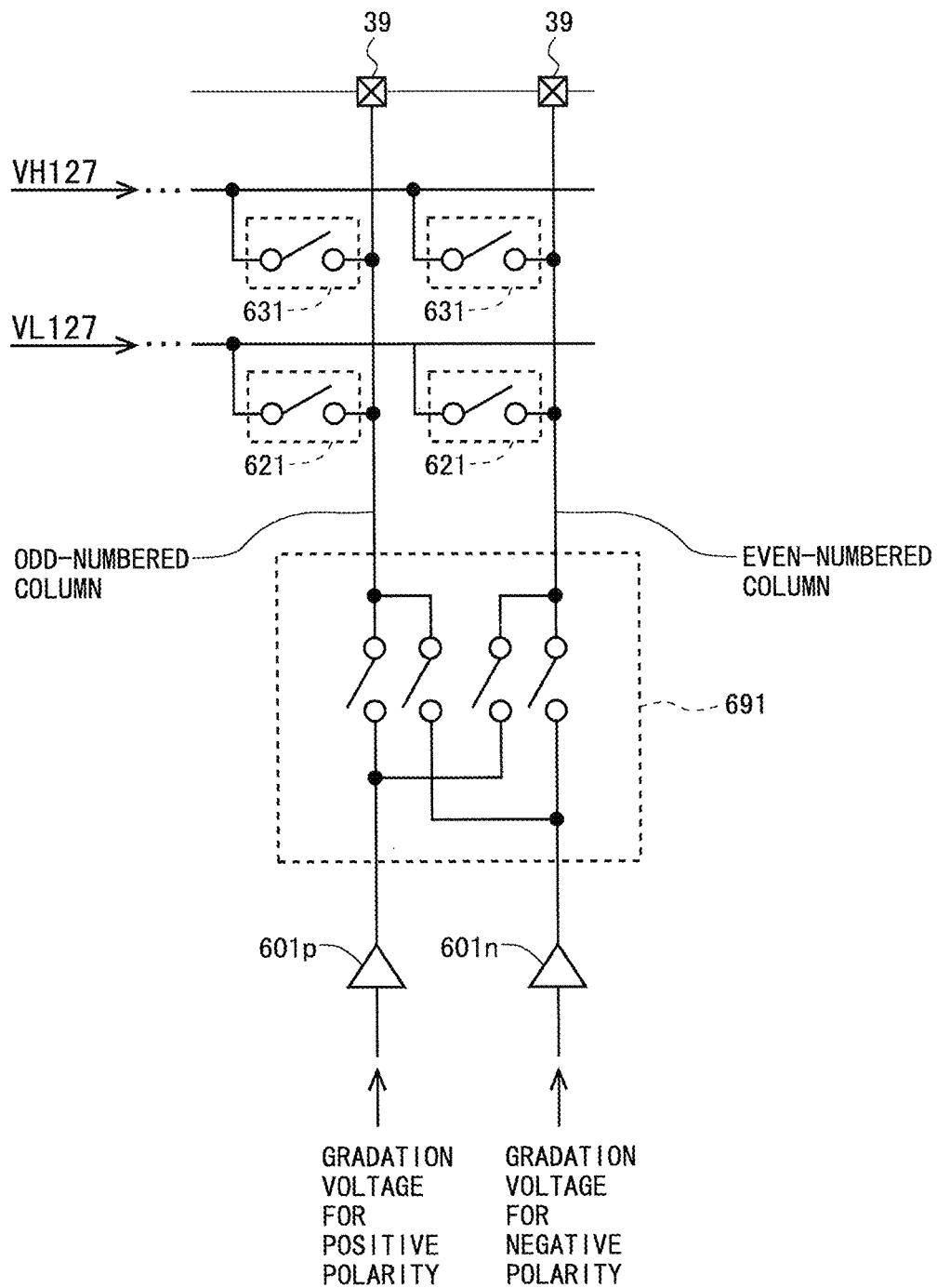
FIG. 8 is a diagram for describing a case in which an output amplifier for positive polarity and an output amplifier for negative polarity are provided separately in the first embodiment.
Figure 9:
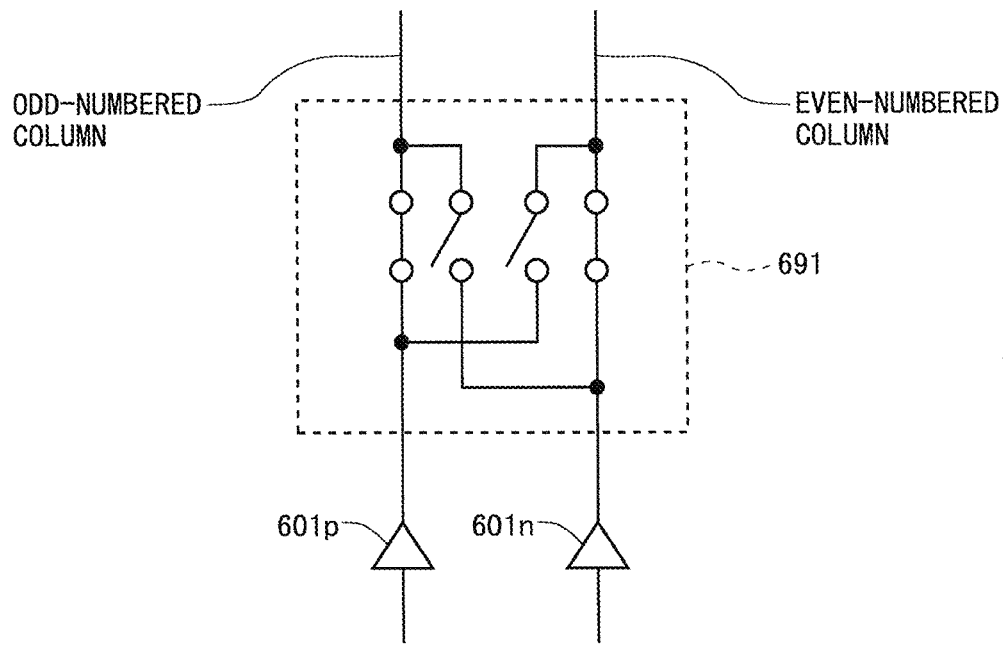
FIG. 9 is a diagram for describing the case in which an output amplifier for positive polarity and an output amplifier for negative polarity are provided separately in the first embodiment.
Figure 10:
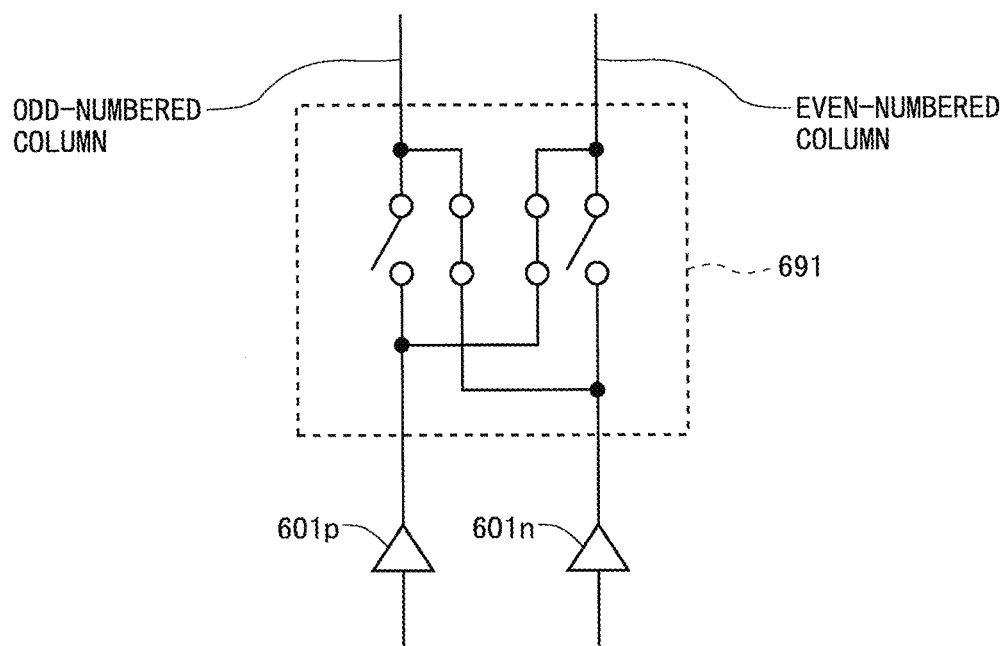
FIG. 10 is a diagram for describing the case in which an output amplifier for positive polarity and an output amplifier for negative polarity are provided separately in the first embodiment.

Meanwhile, FIG. 7 shows a configuration for a case in which each of the output amplifiers 601 to 603 can output both a positive-polarity data voltage and a negative-polarity data voltage. However, there is also a case in which an output amplifier for positive polarity and an output amplifier for negative polarity are provided separately, which will be described with reference to FIGS. 8 to 10. As shown in FIG. 8, in a case in which an output amplifier 601p for positive polarity and an output amplifier 601n for negative polarity are provided separately, an output switching switch 691 is provided between the switches 621 and the output amplifiers 601p and 601n. When a positive-polarity data voltage is to be applied to a source bus line SL in an odd-numbered column and a negative-polarity data voltage is to be applied to a source bus line SL in an even-numbered column, the state of the output switching switch 691 is controlled such that a connection relationship such as that shown in FIG. 9 is obtained. On the other hand, when a negative-polarity data voltage is to be applied to the source bus line SL in the odd-numbered column and a positive-polarity data voltage is to be applied to the source bus line SL in the even-numbered column, the state of the output switching switch 691 is controlled such that a connection relationship such as that shown in FIG. 10 is obtained. As such, a configuration in which the output amplifier 601p for positive polarity and the output amplifier 601n for negative polarity are provided separately can also be adopted.

1.3 Drive Method

Next, a drive method of the present embodiment will be described. In the present embodiment, a period for charging the source bus lines SL (data voltage application period) includes an adjustment period which is a period provided to adjust charging rates; and an all-line charging period during which desired data voltages are applied to all source bus lines SL. During the adjustment period, predetermined voltages are applied to the source bus lines SL whose charging rates are to be adjusted (specifically, the source bus lines SL arranged in the area Ar2) without application of data voltages. Then, the application of desired data voltages to the source bus lines SL whose charging rates are to be adjusted starts in the all-line charging period following the adjustment period. A detailed description will be made below.

FIG. 11 is a diagram showing the on/off state of each switch in the output circuit 36 during an adjustment period in a given frame. When taking a look at the components provided for the area Ar1, the switches 621 and the switches 631 are in an off state. At this time, the output amplifiers 601 are in operation. Therefore, during the adjustment period, desired data voltages are applied to the source bus lines SL arranged in the area Ar1. Likewise, to the source bus lines SL arranged in the area Ar3, too, are applied desired data voltages during the adjustment period.

When taking a look at the components provided for the odd-numbered column in the area Ar2, the switch 622 is in an on state and the switch 632 is in an off state. At this time, the operation of the output amplifier 602 in the odd-numbered column is stopped. Therefore, the gradation voltage VH127 is applied to the source bus line SL in the odd-numbered column arranged in the area Ar2. When taking a look at the components provided for the even-numbered column in the area Ar2, the switch 632 is in an on state and the switch 622 is in an off state. At this time, the operation of the output amplifier 602 in the even-numbered column is stopped. Therefore, the gradation voltage VL127 is applied to the source bus line SL in the even-numbered column arranged in the area Ar2. As such, during the adjustment period, for the source bus lines SL arranged in the area Ar2, charge sharing control is performed in which predetermined voltages (here, the gradation voltages VH127 and VL127) different from data voltages are applied. Note that by adopting gradation voltages as the predetermined voltages for charge sharing control, it becomes unnecessary to provide special voltages to the output circuit 36.

As described above, during the adjustment period, desired data voltages are applied to the source bus lines SL arranged in the area Ar1 and the source bus lines SL arranged in the area Ar3, and the gradation voltage VH127 or the gradation voltage VL127 is applied to each of the source bus lines SL arranged in the area Ar2 by charge sharing control.

Note that the length of the adjustment period may be determined taking into account, for example, the shape of the liquid crystal panel 500 or estimation information about load (information on a load distribution or a constant) in the liquid crystal panel 500. In addition, for example, the length of the adjustment period may be determined by performing a visual check of a display state with the liquid crystal panel 500 being turned on with pre-assumed settings, or measuring optical characteristics using a predetermined device. The length of the adjustment period is, for example, 6.4 microseconds.

Figure 12:
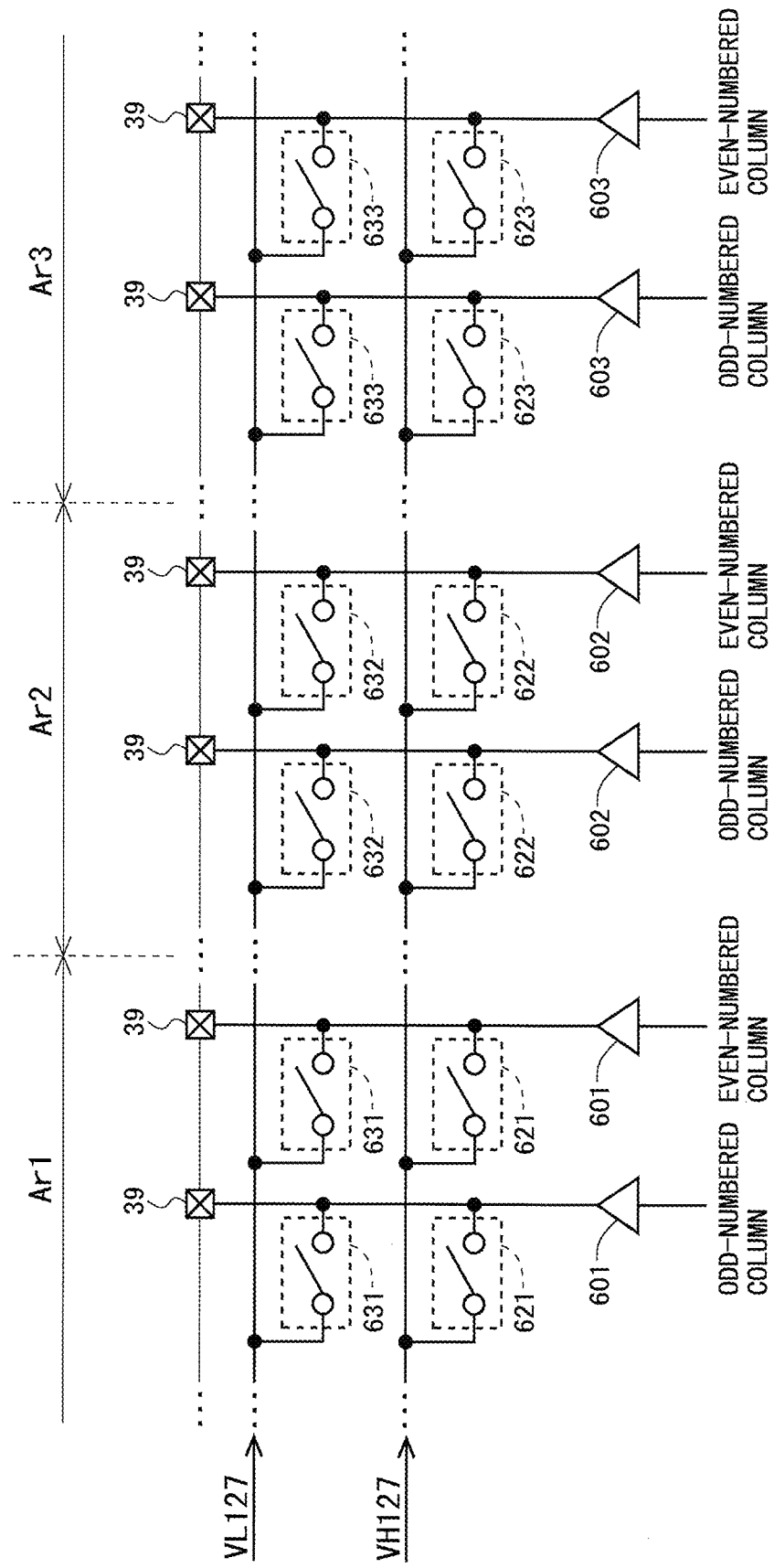
FIG. 12 is a diagram showing the on/off state of each switch in the output circuit during an all-line charging period in the given frame in the first embodiment.

FIG. 12 is a diagram showing the on/off state of each switch in the output circuit 36 during an all-line charging period in the given frame. When taking a look at the components provided for the area Ar1 and the components provided for the area Ar3, the on/off states of all switches are the same as those for the above-described adjustment period (see FIG. 11). At this time, the output amplifiers 601 and 603 are in operation. Thus, the desired data voltages are applied to the source bus lines SL arranged in the area Ar1 and the source bus lines SL arranged in the area Ar3 continuously from the adjustment period. When taking a look at the components provided for the area Ar2, the switches 622 and the switches 632 are in an off state. At this time, the output amplifiers 602 are in operation. Thus, to the source bus lines SL arranged in the area Ar2, too, are applied desired data voltages. As described above, during the all-line charging period, desired data voltages are applied to all source bus lines SL in the display unit 510.

Figure 13:
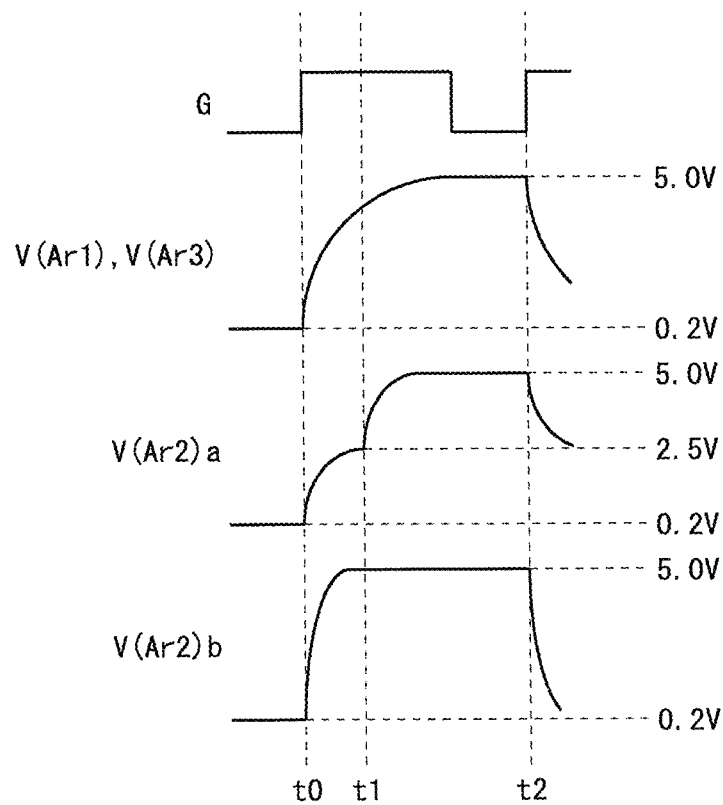
FIG. 13 is a waveform diagram showing an example of changes in source voltage for when a data voltage changes from 0.2 V to 5.0 V during a given horizontal scanning period in a given frame in the first embodiment.

FIG. 13 is a waveform diagram showing an example of changes in source voltage for when a data voltage changes from 0.2 V to 5.0 V during a given horizontal scanning period in a given frame. Note that, in this specification, voltages outputted from the output amplifiers 601 to 603 in the output circuit 36 are referred to as "data voltages", and voltages (potentials) at each point in time on the source bus lines SL in the display unit 510 are referred to as "source voltages". Note also that here it is assumed that the gradation voltage VH127 is 2.5 V. In the example shown in FIG. 13, a period from point in time t0 to point in time t1 is an adjustment period, and a period from point in time t1 to point in time t2 is an all-line charging period. Regarding FIG. 13, reference character G indicates a scanning signal, reference character V(Ar1) indicates a source voltage for a source bus line SL arranged in the area Ar1, reference character V(Ar3) indicates a source voltage for a source bus line SL arranged in the area Ar3, reference character V(Ar2)a indicates a source voltage for a source bus line SL arranged in the area Ar2, and reference character V(Ar2)b indicates a source voltage for the source bus line SL arranged in the area Ar2 for when it is assumed that an adjustment period is not provided.

In the area Ar1 and the area Ar3, the application of desired data voltages to the source bus lines SL starts at point in time t0 (the start point in time of the adjustment period), and the desired data voltages are applied to the source bus lines SL throughout the adjustment period and the all-line charging period. Therefore, as shown in FIG. 13, after point in time t0, the source voltages gradually change toward a target voltage (5.0 V). Then, the source voltages reach the target voltage (5.0 V) at some point in time of the all-line charging period.

On the other hand, in the area Ar2, during the adjustment period, the gradation voltage VH127 is applied to the source bus line SL. Therefore, in the area Ar2, the source voltages reach only 2.5 V at the end point in time of the adjustment period. Then, at point in time t1 (the end point in time of the adjustment period, i.e., the start point in time of the all-line charging period), the application of desired data voltages to the source bus lines SL starts. By this, the source voltages reach the target voltage (5.0 V) at some point in time of the all-line charging period.

Here, when a waveform indicated by reference character V(Ar2)a is compared with a waveform indicated by reference character V(Ar2)b in FIG. 13, it can be grasped that regarding the source bus line SL arranged in the area Ar2, by providing an adjustment period during which charge sharing control such as that described above is performed, the settling time of the data voltages becomes longer than the original settling time.

1.4 Effects

According to the present embodiment, the output circuit 36 in the source driver 300 is configured to selectively output data voltages and the gradation voltages VH127 and VL127 corresponding to the gradation value at the intermediate level by controlling the switches 621 to 623 and 631 to 633 and the output amplifiers 601 to 603. In addition, the display control circuit 200 is provided with the register 21 that stores information identifying source bus lines SL whose charging rates are to be adjusted; and the charge sharing control unit 22 that outputs charge sharing control signals SCH to the output circuit 36 based on the information stored in the register 21. Then, the on/off state of each switch in the output circuit 36 and the operation of each output amplifier in the output circuit 36 are controlled by the charge sharing control signals SCH. By this, during each horizontal scanning period, for each of the source bus lines SL specified by the register 21, a gradation voltage corresponding to the gradation value at the intermediate level is applied for a certain period and then a desired data voltage is applied. Here, by setting source bus lines SL with small load as target of adjusting charging rate, the settling time of data voltages on the source bus lines SL with small load can be made longer than the original settling time. By this, differences in the settling time of data voltages between the plurality of source bus lines SL are reduced. As a result, a uniform charging rate is achieved across the entire display unit 510, suppressing the occurrence of abnormal display (display of an image called vertical gradation). Note that unlike the invention disclosed in Japanese Laid-Open Patent Publication No. 2008-70404, a data voltage is not corrected by correcting the values of RGB signals. Therefore, according to the present embodiment, a correction can be made at a level corresponding to luminance less than one gradation.

As described above, according to the present embodiment, a liquid crystal display device is implemented that can suppress the occurrence of abnormal display caused by the "differences in the settling time of data voltages (to be applied to the source bus lines SL)" between the positions of the source bus lines SL.

1.5 Variants

1.5.1 First Variant

Figure 14:
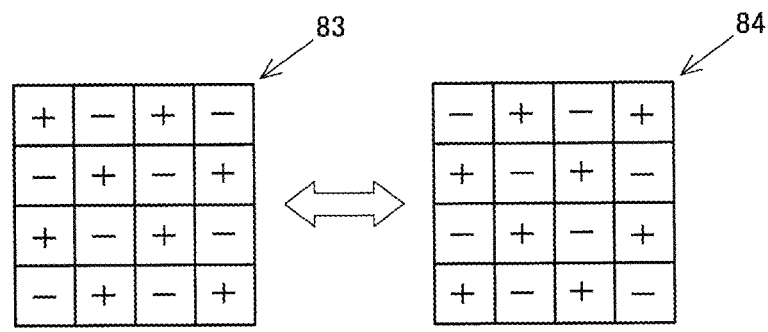
FIG. 14 is a diagram showing polarity patterns for a case of adopting a 1-line-dot-reversal driving system, regarding a first variant of the first embodiment.

In the above-described first embodiment, a column-reversal driving system is adopted as a polarity reversal system. However, the polarity reversal system is not particularly limited. Hence, an example in which a 1-line-dot-reversal driving system is adopted as the polarity reversal system will be described as a first variant. Note that the 1-line-dot-reversal driving system is a driving system in which the polarities of pixel voltages are reversed every frame and the polarities of pixels adjacent to each other in a lateral (horizontal) direction and the polarities of pixels adjacent to each other in a longitudinal (vertical) direction are also reversed in each frame. When the 1-line-dot-reversal driving system is adopted, a polarity pattern such as that indicated by reference character 83 in FIG. 14 and a polarity pattern such as that indicated by reference character 84 in FIG. 14 alternately appear every frame.

Figure 15:
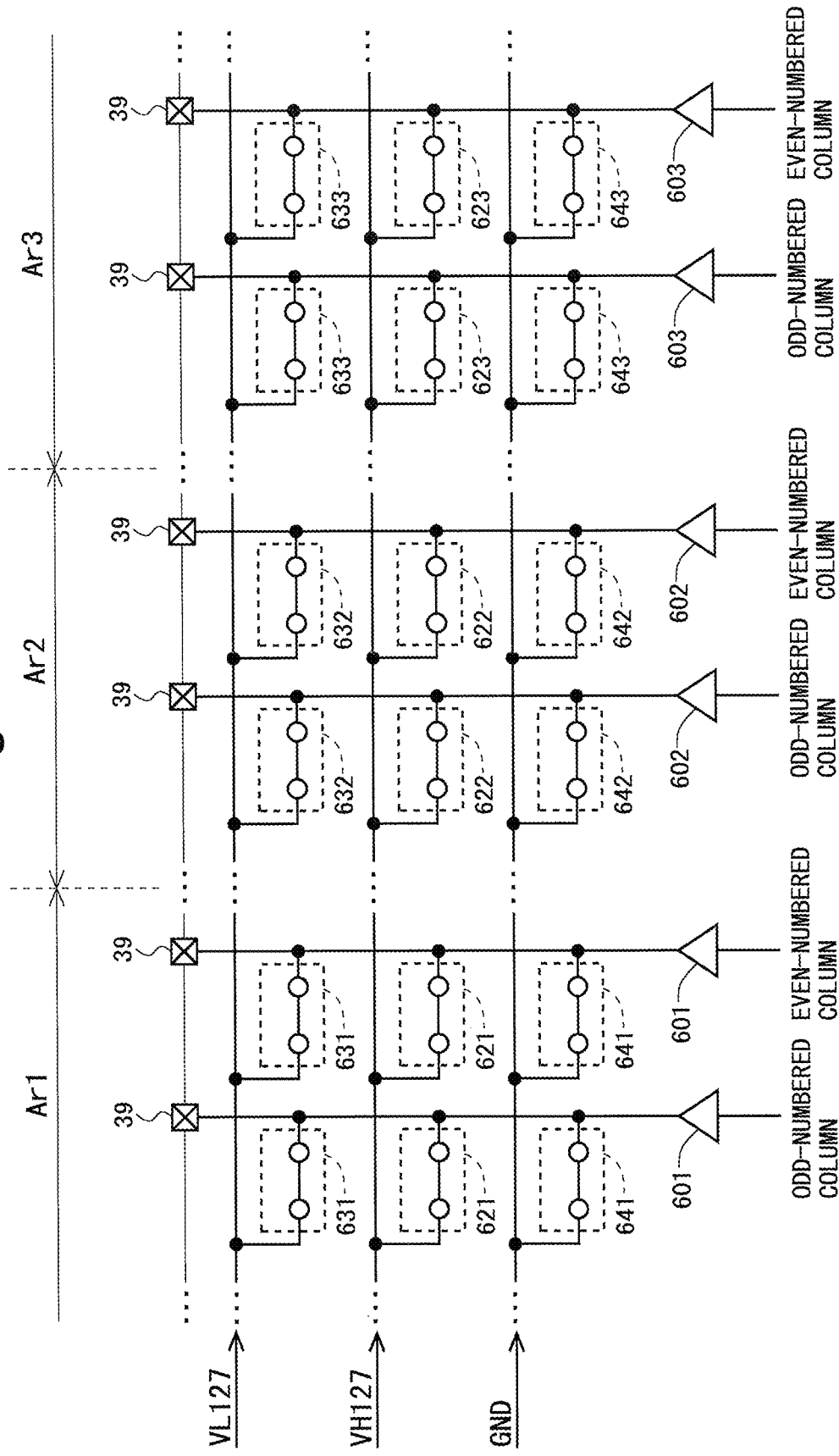
FIG. 15 is a circuit diagram showing a configuration of the output circuit in the source driver in the first variant of the first embodiment.

FIG. 15 is a circuit diagram showing a configuration of the output circuit 36 in the source driver 300 of the present variant. As shown in FIG. 15, a ground voltage GND is provided to the output circuit 36, in addition to the gradation voltages VH127 and VL127. In addition, the output circuit 36 is provided with switches 641 to 643 that control the application of the ground voltage GND to the source bus lines SL, in addition to the components of the above-described first embodiment (see FIG. 7).

When the 1-line-dot-reversal driving system is adopted, as described above, the polarities of pixels adjacent to each other in the longitudinal (vertical) direction are reversed. That is, when taking a look at each source bus line SL, regarding two consecutive horizontal scanning periods, the polarity of a data voltage for a preceding horizontal scanning period is opposite to the polarity of a data voltage for a subsequent horizontal scanning period. For example, when the polarity of a data voltage for a preceding horizontal scanning period is positive polarity, the polarity of a data voltage for a subsequent horizontal scanning period is negative polarity. Hence, in the present variant, a period during which the ground voltage GND is applied to all source bus lines SL (hereinafter, referred to as a "ground voltage application period") is provided at the beginning of each horizontal scanning period. After the ground voltage application period, as in the above-described first embodiment, an adjustment period and an all-line charging period are provided.

Figure 16:
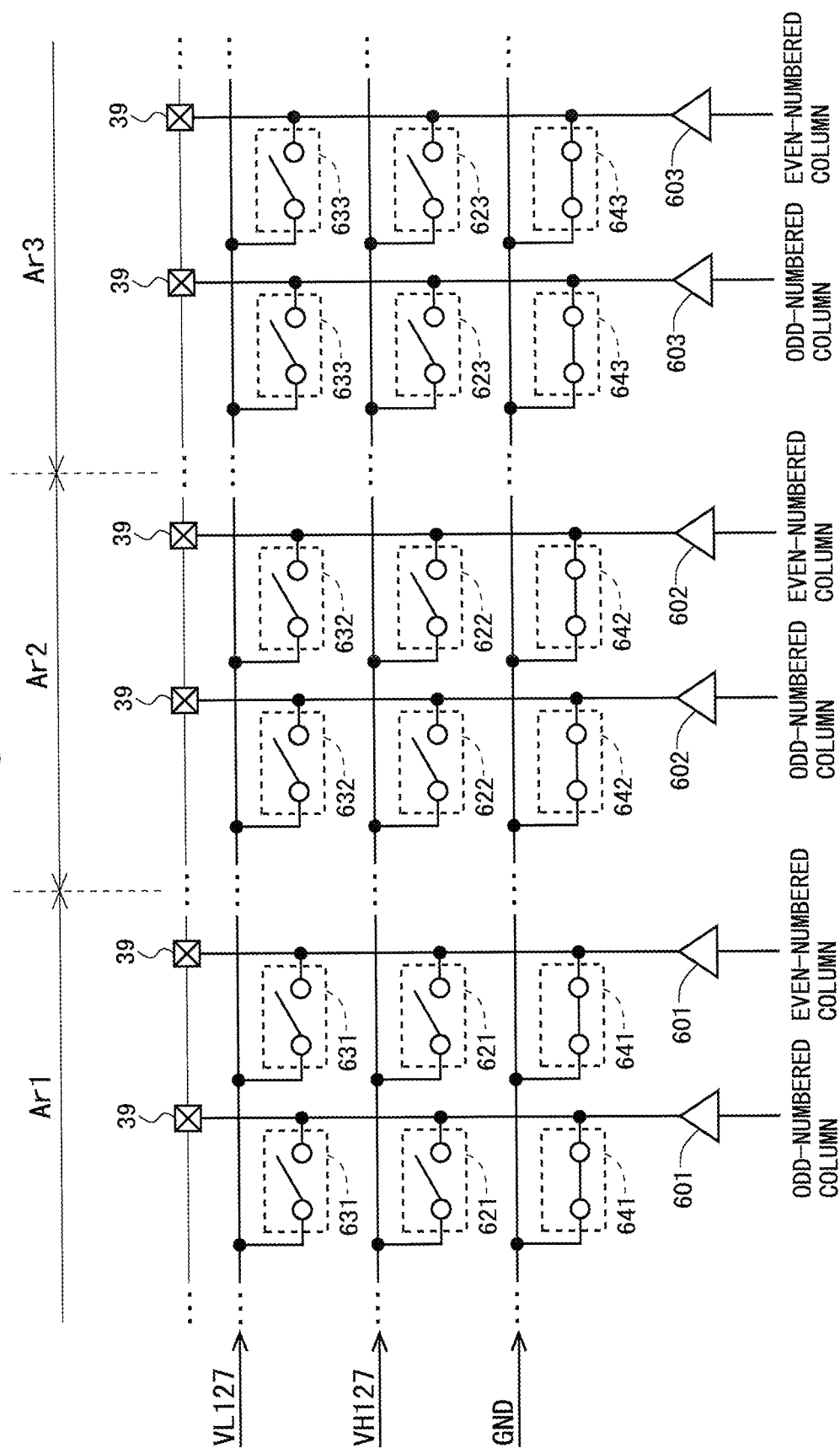
FIG. 16 is a diagram showing the on/off state of each switch in the output circuit during a ground voltage application period in a given frame in the first variant of the first embodiment.

FIG. 16 is a diagram showing the on/off state of each switch in the output circuit 36 during a ground voltage application period in a given frame. When taking a look at the components provided for the area Ar1, the switches 641 are in an on state, and the switches 621 and the switches 631 are in an off state. At this time, the operation of the output amplifiers 601 is stopped. Therefore, the ground voltage GND is applied to the source bus lines SL arranged in the area Ar1. Likewise, the ground voltage GND is also applied to the source bus lines SL arranged in the area Ar2 and the source bus lines SL arranged in the area Ar3. As described above, during the ground voltage application period, the ground voltage GND is applied to all source bus lines SL in the display unit 510.

Figure 17:
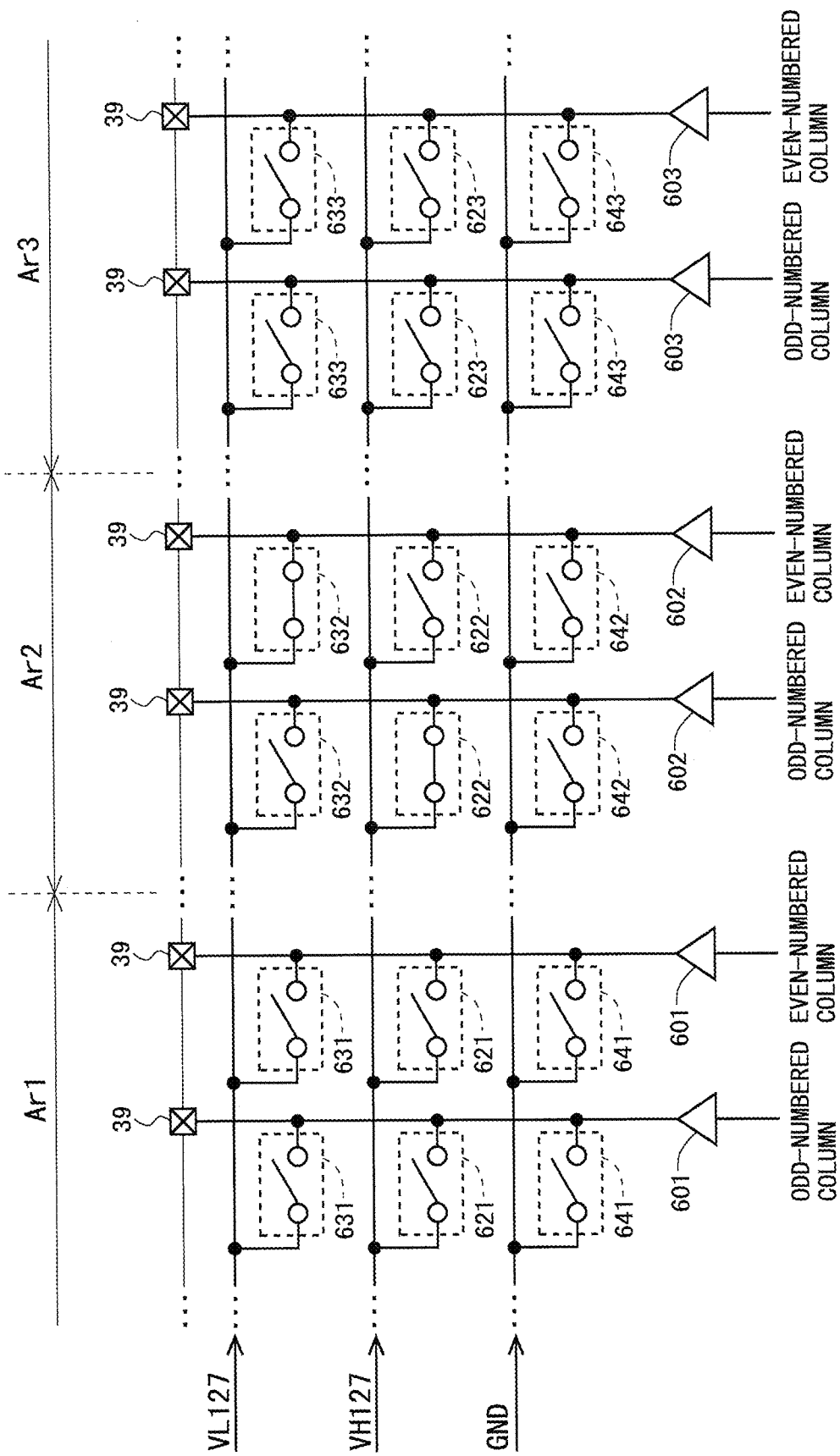
FIG. 17 is a diagram showing the on/off state of each switch in the output circuit during an adjustment period in the given frame in the first variant of the first embodiment.

FIG. 17 is a diagram showing the on/off state of each switch in the output circuit 36 during an adjustment period in the given frame. When taking a look at the components provided for the area Ar1, all switches 621, 631, and 641 are in an off state. At this time, the output amplifiers 601 are in operation. The components provided for the area Ar3 are also the same as those for the area Ar1. When taking a look at the components provided for the odd-numbered column in the area Ar2, only the switch 622 is in an on state, and when taking a look at the components provided for the even-numbered column in the area Ar2, only the switch 632 is in an on state. At this time, the operation of the output amplifiers 602 is stopped. By the above, during the adjustment period, as in the above-described first embodiment, desired data voltages are applied to the source bus lines SL arranged in the area Ar1 and the source bus lines SL arranged in the area Ar3, and the gradation voltage VH127 or the gradation voltage VL127 is applied to each of the source bus lines SL arranged in the area Ar2 by charge sharing control.

Figure 18:
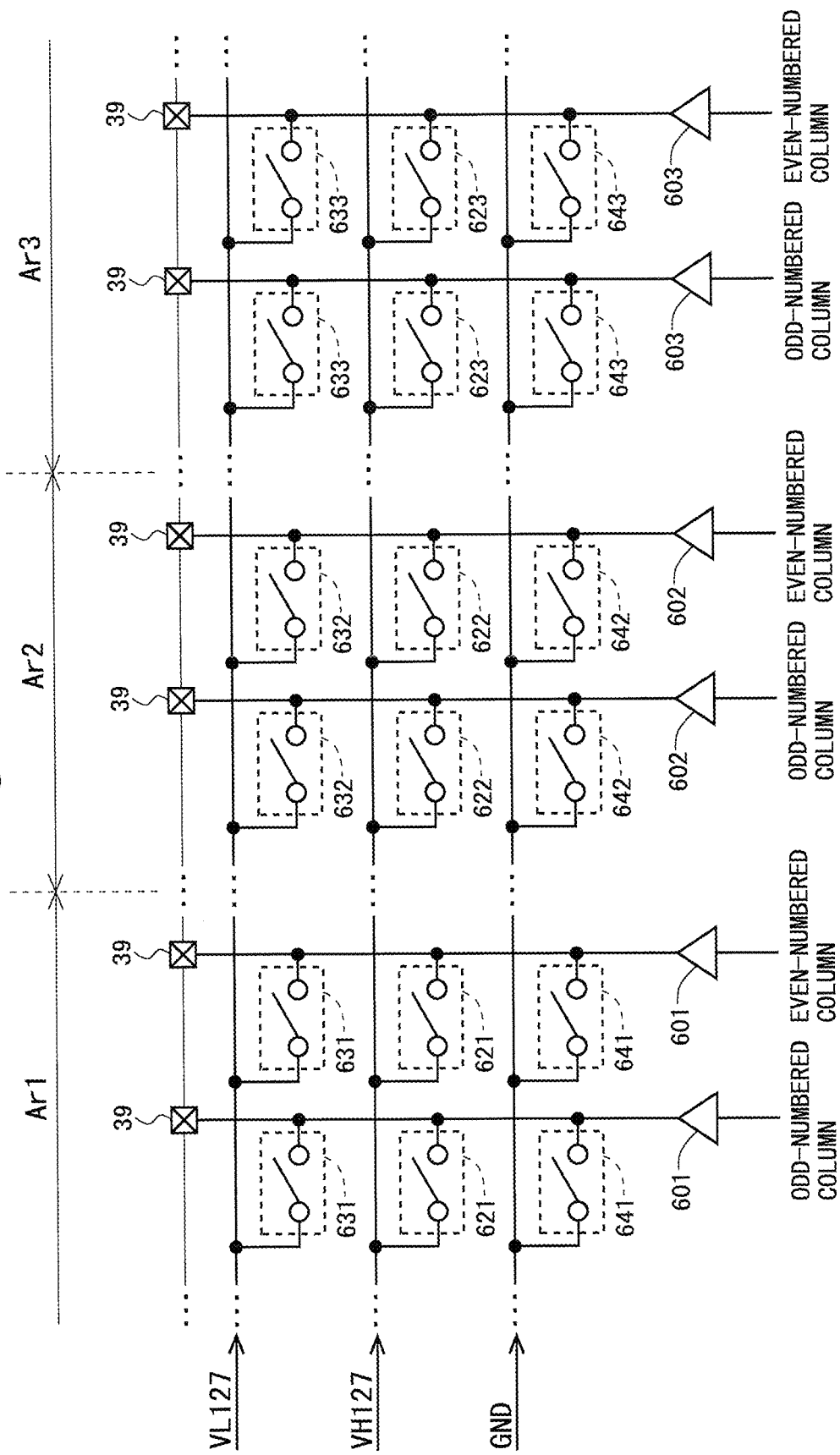
FIG. 18 is a diagram showing the on/off state of each switch in the output circuit during an all-line charging period in the given frame in the first variant of the first embodiment.

FIG. 18 is a diagram showing the on/off state of each switch in the output circuit 36 during an all-line charging period in the given frame. When taking a look at the components provided for the area Ar1, all switches 621, 631, and 641 are in an off state. At this time, the output amplifiers 601 are in operation. The components provided for the area Ar2 and the components provided for the area Ar3 are also the same as those for the area Ar1. By the above, during the all-line charging period, as in the above-described first embodiment, desired data voltages are applied to all source bus lines SL in the display unit 510.

Figure 19:
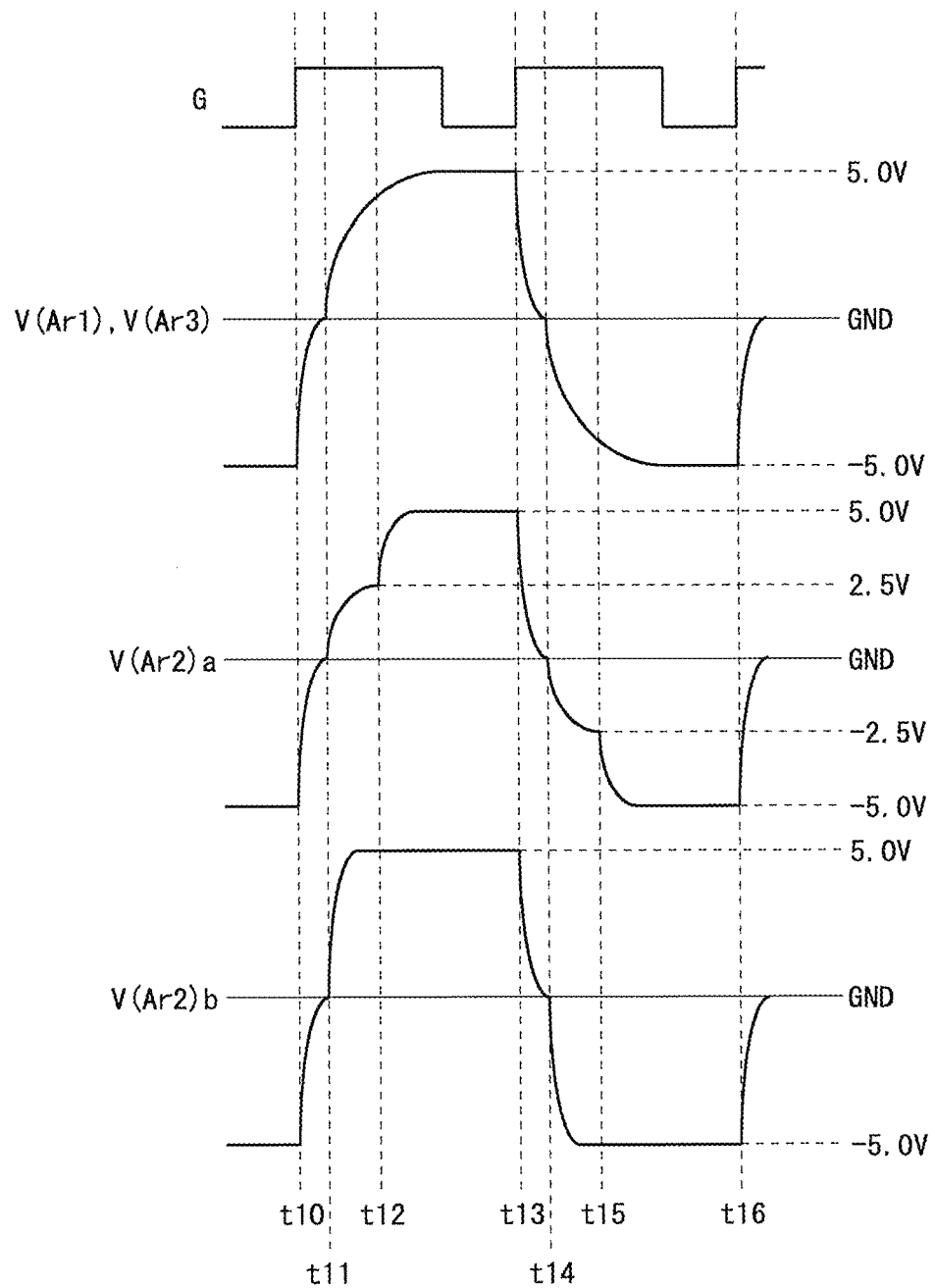
FIG. 19 is a waveform diagram showing an example of changes in source voltage for when a data voltage changes from −5.0 V to 5.0 V during the preceding one of two consecutive horizontal scanning periods, and changes from 5.0 V to −5.0 V during the subsequent one in the first variant of the first embodiment.

FIG. 19 is a waveform diagram showing an example of changes in source voltage for when a data voltage changes from −5.0 V to 5.0 V during the preceding one of two consecutive horizontal scanning periods, and changes from 5.0 V to −5.0 V during the subsequent one. In the example shown in FIG. 19, a period from point in time t10 to point in time t11 and a period from point in time t13 to point in time t14 are ground voltage application periods, a period from point in time t11 to point in time t12 and a period from point in time t14 to point in time t15 are adjustment periods, and a period from point in time t12 to point in time t13 and a period from point in time t15 to point in time t16 are all-line charging periods.

During the ground voltage application period, in all of the area Ar1, the area Ar2, and the area Ar3, the ground voltage GND is applied to the source bus lines SL. By this, in all of the area Ar1, the area Ar2, and the area Ar3, the source voltages change toward 0 V. As a result, the source voltages reach 0 V at the end point in time of the ground voltage application period (note, however, that the source voltages may not reach 0 V during this period).

In the area Ar1 and the area Ar3, desired data voltages are applied to the source bus lines SL throughout the adjustment period and the all-line charging period. Therefore, during the preceding horizontal scanning period, after point in time t11, the source voltages gradually change toward a target voltage (5.0 V) from 0 V and reach the target voltage (5.0 V) at some point in time of the all-line charging period. In addition, during the subsequent horizontal scanning period, after point in time t14, the source voltages gradually change toward a target voltage (−5.0 V) from 0 V and reach the target voltage (−5.0 V) at some point in time of the all-line charging period.

On the other hand, in the area Ar2, during the adjustment period in the preceding horizontal scanning period, the gradation voltage VH127 is applied to the source bus lines SL, and during the adjustment period in the subsequent horizontal scanning period, the gradation voltage VL127 is applied to the source bus lines SL. Therefore, in the area Ar2, the source voltages reach only 2.5 V at the end point in time of the adjustment period in the preceding horizontal scanning period, and reach only −2.5 V at the end point in time of the adjustment period in the subsequent horizontal scanning period. Then, during the preceding horizontal scanning period, at point in time t12 (the end point in time of the adjustment period, i.e., the start point in time of the all-line charging period), the application of desired data voltages to the source bus lines SL starts, and during the subsequent horizontal scanning period, at point in time t15 (the end point in time of the adjustment period, i.e., the start point in time of the all-line charging period), the application of desired data voltages to the source bus lines SL starts. By this, the source voltages reach the target voltage (5.0 V or −5.0 V) at some point in time of the all-line charging period.

Here, when a waveform indicated by reference character V(Ar2)a is compared with a waveform indicated by reference character V(Ar2)b in FIG. 19, it can be grasped that regarding the source bus line SL arranged in the area Ar2, as in the above-described first embodiment, by providing an adjustment period during which charge sharing control is performed, the settling time of the data voltages becomes longer than the original settling time. As such, since the settling time of data voltages on source bus lines SL with small load becomes longer than the original settling time, differences in the settling time of data voltages between the plurality of source bus lines SL are reduced. As a result, a uniform charging rate is achieved across the entire display unit 510, suppressing the occurrence of abnormal display (display of an image called vertical gradation).

As described above, when the 1-line-dot-reversal driving system is adopted as the polarity reversal system, too, the occurrence of abnormal display caused by the "differences in the settling time of data voltages (to be applied to the source bus lines SL)" between the positions of the source bus lines SL can be suppressed.

1.5.2 Second Variant

In the above-described first embodiment, a gradation voltage corresponding to the gradation value at the intermediate level is applied, for a certain period, to source bus lines SL whose charging rates are to be adjusted and then desired data voltages are applied to the source bus lines SL. However, the voltage (a voltage for charge sharing control) applied to the source bus line SL before the application of the desired data voltage is not limited to the gradation voltage corresponding to the gradation value at the intermediate level. As the voltage applied to the source bus line SL before the application of the desired data voltage, for example, a certain voltage (+3 V, −3 V, +5 V, −5 V, etc.) supplied from a host, a ground voltage GND, etc., can also be adopted.

1.5.3 Third Variant

In the above-described first embodiment, the liquid crystal panel 500 and the display unit 510 have a right-angled U-shape as viewed from the top. However, the shapes of the liquid crystal panel 500 and the display unit 510 are not particularly limited. Hence, an example in which the present invention is applied to a liquid crystal display device for in-vehicle use will be described as a third variant.

Figure 20:
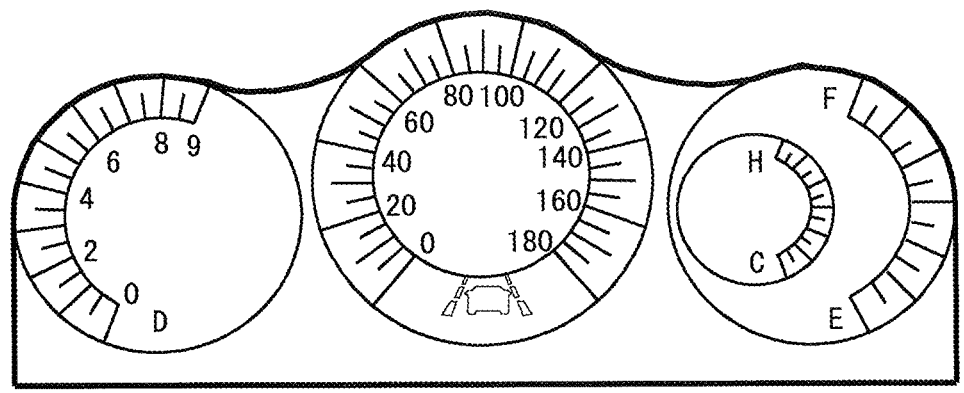
FIG. 20 is a front view of a liquid crystal display device for in-vehicle use according to a second variant of the first embodiment.
Figure 21:
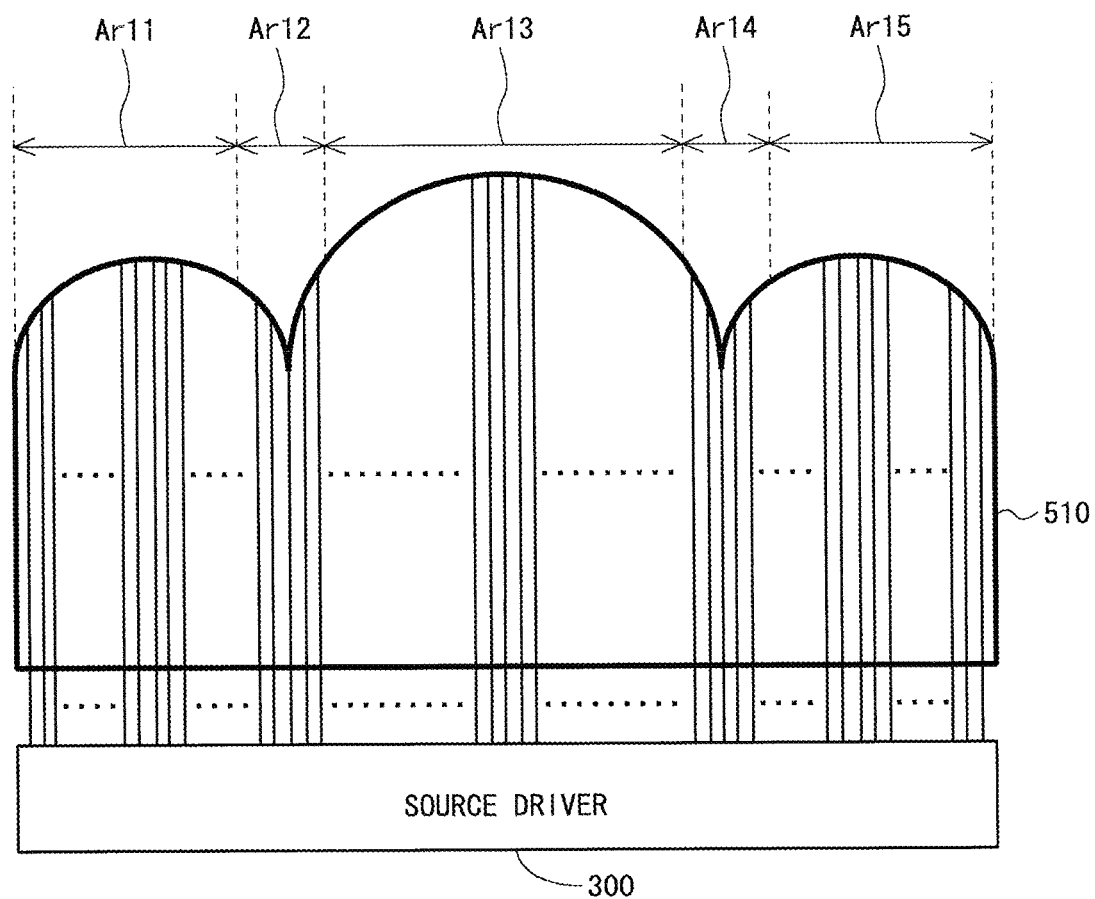
FIG. 21 is a diagram for describing divisions of the region of the display unit in the second variant of the first embodiment.

FIG. 20 is a front view of a liquid crystal display device for in-vehicle use according to the present variant. It can be grasped from an outward appearance shown in FIG. 20 that the length of a source bus line SL varies depending on the position. Hence, in the present variant, in order to perform charge sharing control, the region in the display unit 510 is logically divided into, for example, five areas Ar11 to Ar15 as shown in FIG. 21.

The area Ar13 is an area with large load. The area Ar11 and the area Ar15 are areas with medium load. The area Ar12 and the area Ar14 are areas with small load. Therefore, in order to achieve a uniform charging rate across the entire display unit 510, charge sharing control is not performed for the area Ar13, charge sharing control is performed for the area Ar11 and the area Ar15 for a comparatively short period, and charge sharing control is performed for the area Ar12 and the area Ar14 for a comparatively long period. That is, in the present variant, the display unit 510 is logically divided into five areas, and the charge sharing control unit 22 controls the operation of the output circuit 36 such that a period during which charge sharing control is performed is longer (in other words, the amount of delay in the application start timing of a desired data voltage is larger) for an area with smaller load on source bus lines SL.

Note that in the present variant the source bus lines SL whose charging rates are to be adjusted include source bus lines SL for which charge sharing control is performed for a comparatively short period; and source bus lines SL for which charge sharing control is performed for a comparatively long period. Therefore, the register 21 in the display control circuit 200 also stores, regarding the source bus lines SL whose charging rates are to be adjusted, information by which whether the period during which charge sharing control is performed is a comparatively short period or a comparatively long period can be identified. Then, the charge sharing control unit 22 outputs charge sharing control signals SCH based on the information stored in the register 21 so that charge sharing control is performed for periods having different lengths for the areas Ar11 and Ar15 and the areas Ar12 and Ar14. By this, as adjustment periods for adjusting the charging rates, an adjustment period for the areas Ar11 and Ar15 and an adjustment period for the areas Ar12 and Ar14 are prepared. The adjustment period for the areas Ar11 and Ar15 and the adjustment period for the areas Ar12 and Ar14 have the same start timing and different end timings.

As described above, in the present variant, source bus lines SL whose charging rates are to be adjusted are divided into two groups (a group including the area Ar11 and the area Ar15 and a group including the area Ar12 and the area Ar14), and two adjustment periods having the same start timing and different end timings are prepared for the two groups. Then, the charge sharing control unit 22 controls the operation of the output circuit 36 such that to each source bus line SL included in each group, during an adjustment period corresponding to relevant group, a predetermined voltage (gradation voltage VH127 or VL127) different from a data voltage is applied.

Note that when source bus lines SL whose charging rates are to be adjusted are divided into three or more groups, too, the present invention can be applied in the same manner. By thus dividing source bus lines SL whose charging rates are to be adjusted into multiple groups as appropriate, it becomes possible to more minutely adjust the charging rates. By this, the occurrence of abnormal display is more effectively suppressed.

Figure 22:
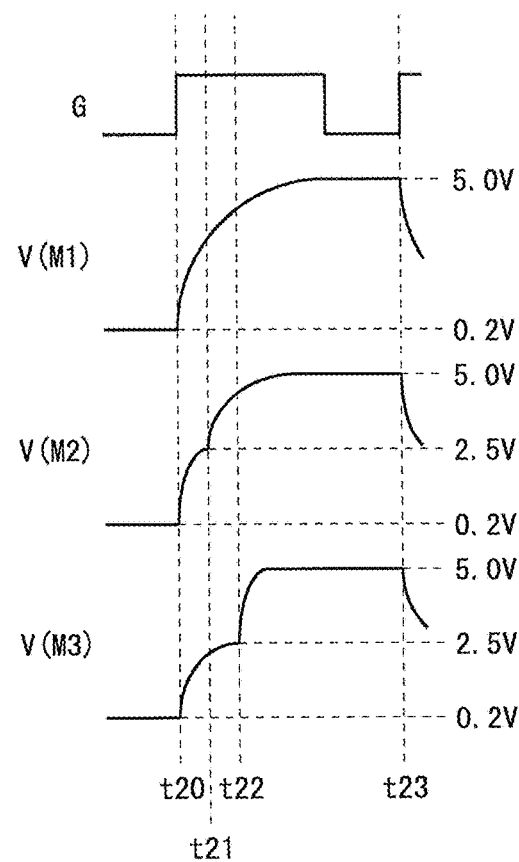
FIG. 22 is a waveform diagram showing an example of changes in source voltage for when a data voltage changes from 0.2 V to 5.0 V during a given horizontal scanning period in a given frame in the second variant of the first embodiment.

FIG. 22 is a waveform diagram showing an example of changes in source voltage for when a data voltage changes from 0.2 V to 5.0 V during a given horizontal scanning period in a given frame in the present variant. Regarding FIG. 22, reference character V(M1) indicates a source voltage for a source bus line SL arranged in the area Ar13, reference character V(M2) indicates a source voltage for source bus lines SL arranged in the area Ar11 and the area Ar15, and reference character V(M3) indicates a source voltage for source bus lines SL arranged in the area Ar12 and the area Ar14. In the example shown in FIG. 22, a period from point in time t20 to point in time t21 is an adjustment period for the area Ar11 and the area Ar15, a period from point in time t20 to point in time t22 is an adjustment period for the area Ar12 and the area Ar14, and a period from point in time t22 to point in time t23 is an all-line charging period.

In the area Ar13, at point in time t20, the application of desired data voltages to the source bus lines SL starts, and the desired data voltages are applied to the source bus lines SL throughout a period from point in time t20 to point in time t22. Therefore, as shown in FIG. 22, after point in time t20, the source voltages gradually change toward a target voltage (5.0 V). Then, the source voltages reach the target voltage (5.0 V) at some point in time of the all-line charging period.

In the area Ar11 and the area Ar15, during a period from point in time t20 to point in time t21, the gradation voltage VH127 is applied to the source bus lines SL. Therefore, at point in time t21, in the area Ar11 and the area Ar15, the source voltages reach only 2.5 V. Then, at point in time t21, the application of desired data voltages to the source bus lines SL starts. By this, the source voltages reach the target voltage (5.0 V) at some point in time of the all-line charging period.

In the area Ar12 and the area Ar14, during a period from point in time t20 to point in time t22, the gradation voltage VH127 is applied to the source bus lines SL. Therefore, at point in time t22, in the area Ar12 and the area Ar14, the source voltages reach only 2.5 V. Then, at point in time t22, the application of desired data voltages to the source bus lines SL starts. By this, the source voltages reach the target voltage (5.0 V) at some point in time of the all-line charging period.

As described above, by performing charge sharing control depending on the magnitude of load on the source bus lines SL, regarding source bus lines SL with small load, the settling time of data voltages becomes remarkably longer than the original settling time, and regarding source bus lines SL with medium load, the settling time of data voltages becomes a bit longer than the original settling time. By this, differences in the settling time of data voltages between the plurality of source bus lines SL are effectively reduced. As a result, a uniform charging rate is achieved across the entire display unit 510, effectively suppressing the occurrence of abnormal display (display of an image called vertical gradation).

Figure 23:
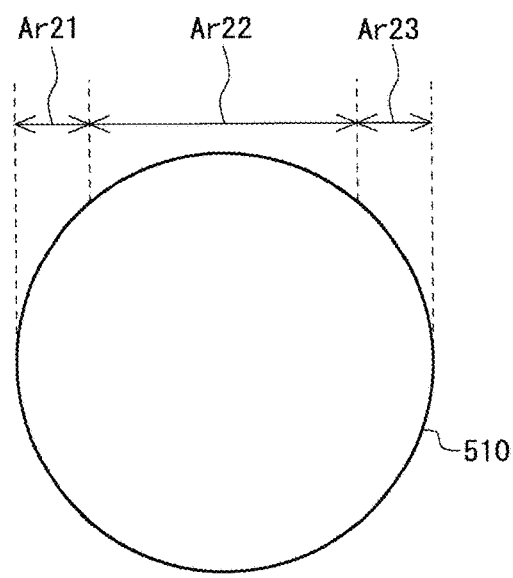
FIG. 23 is a diagram for describing a case in which the present invention is applied to a liquid crystal display device including a circular display unit, regarding the second variant of the first embodiment.

Note that although here an example in which the present invention is applied to a liquid crystal display device for in-vehicle use is described as a variant of the above-described first embodiment, the present invention can also be applied to liquid crystal display devices including display units 510 (liquid crystal panels 500) in various shapes. For example, the present invention can also be applied to a liquid crystal display device including a circular display unit 510 such as that shown in FIG. 23. In this case, in order to achieve a uniform charging rate across the entire display unit 510, for example, charge sharing control is performed only for two areas Ar21 and Ar23 near the left and right edge portions among three areas Ar21 to Ar23.

In addition, regarding a case in which the region in the display unit 510 is divided as shown in FIG. 21, the configuration may be such that two types of voltages for charge sharing are prepared both for positive polarity and for negative polarity, and charge sharing control is performed using different voltages for the areas Ar11 and Ar15 and the areas Ar12 and Ar14 (charge sharing control is not performed for the area Ar13). In this case, as the voltages for charge sharing, gradation voltages may be used or voltages supplied from, for example, a host may be used. Note that by also making the length of a period during which charge sharing control is performed different between areas, it becomes possible to make a more minute adjustment of settling time, i.e., make a more minute adjustment of charging rates.

2. Second Embodiment

2.1 Overview

In the above-described first embodiment, the charging rates are adjusted by charge sharing control in which pre-determined voltages different from data voltages are applied to source bus lines SL. On the other hand, in the present embodiment, the charging rates are adjusted by control in which the timing of outputting desired data voltages from the output amplifiers 601 to 603 is adjusted (hereinafter, referred to as "source output delay control").

2.2 Configuration

Figure 24:
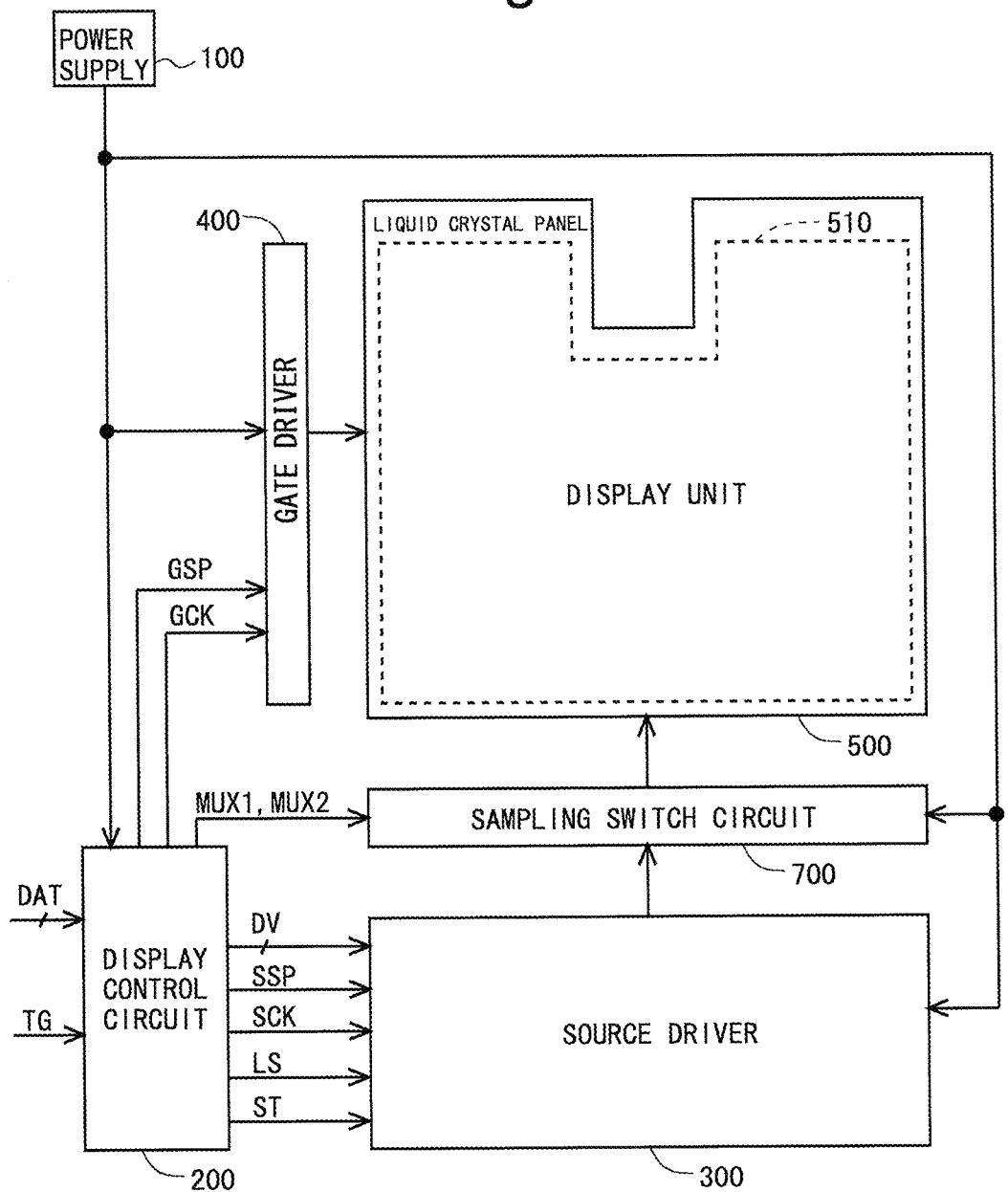
FIG. 24 is a block diagram showing an overall configuration of a liquid crystal display device according to a second embodiment of the present invention.

A configuration of a liquid crystal display device according to the present embodiment will be described. Note, however, that description of the same matter as that of the above-described first embodiment is omitted. FIG. 24 is a block diagram showing an overall configuration of a liquid crystal display device according to the present embodiment. The liquid crystal display device according to the present embodiment is provided with a sampling switch circuit 700, in addition to the components of the above-described first embodiment. The display control circuit 200 outputs a source output control signal ST to the source driver 300, instead of charge sharing control signals SCH (see FIG. 2) of the above-described first embodiment. In addition, the display control circuit 200 outputs a first time-division control signal MUX1 and a second time-division control signal MUX2 for controlling the operation of the sampling switch circuit 700. Note that here a signal wiring line for supplying a data voltage to the sampling switch circuit 700 from the source driver 300 is referred to as an "output signal line". Note also that in the following the first time-division control signal MUX1 and the second time-division control signal MUX2 may be collectively and simply referred to as "time-division control signals".

Figure 4:
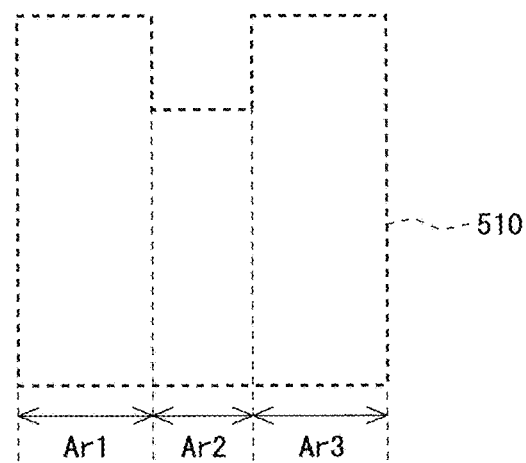
FIG. 4 is a diagram for describing differences in the length of a source bus line between areas in the first embodiment.

Note that in the present embodiment, too, it is assumed that the source bus lines SL arranged in the area Ar1 and the area Ar3 are longer than the source bus lines SL arranged in the area Ar2 (see FIGS. 3 and 4).

Figure 25:
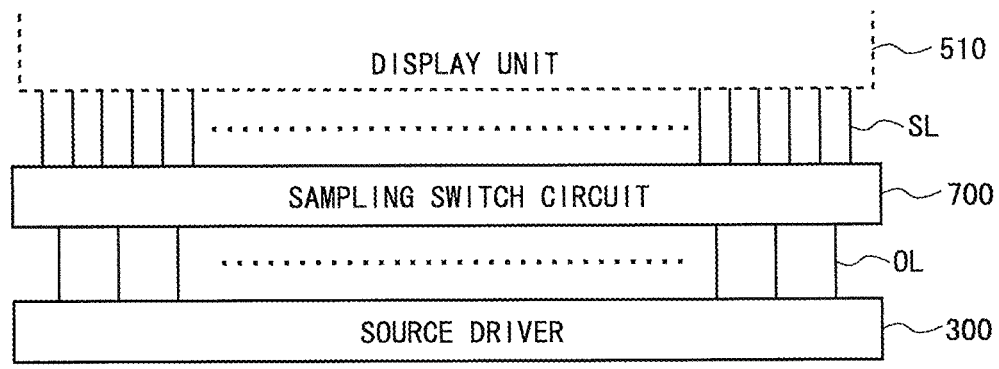
FIG. 25 is a diagram showing a configuration of a portion near a sampling switch circuit in the second embodiment.

The sampling switch circuit 700 receives the first time-division control signal MUX1 and the second time-division control signal MUX2 which are transmitted from the display control circuit 200, and applies data voltages outputted from the source driver 300 to the source bus lines SL in a time-division manner. In the present embodiment, as shown in FIG. 25, the number of source bus lines SL is twice that of output signal lines OL. That is, a data voltage outputted to a single output signal line OL is applied to two source bus lines SL in a time-division manner. As such, in the present embodiment, time-division driving which is also called source shared driving (SSD) is adopted. Note, however, that when time-division driving is not adopted, too, a technique for adjusting charging rates by source output delay control as in the present embodiment can be adopted.

Figure 26:
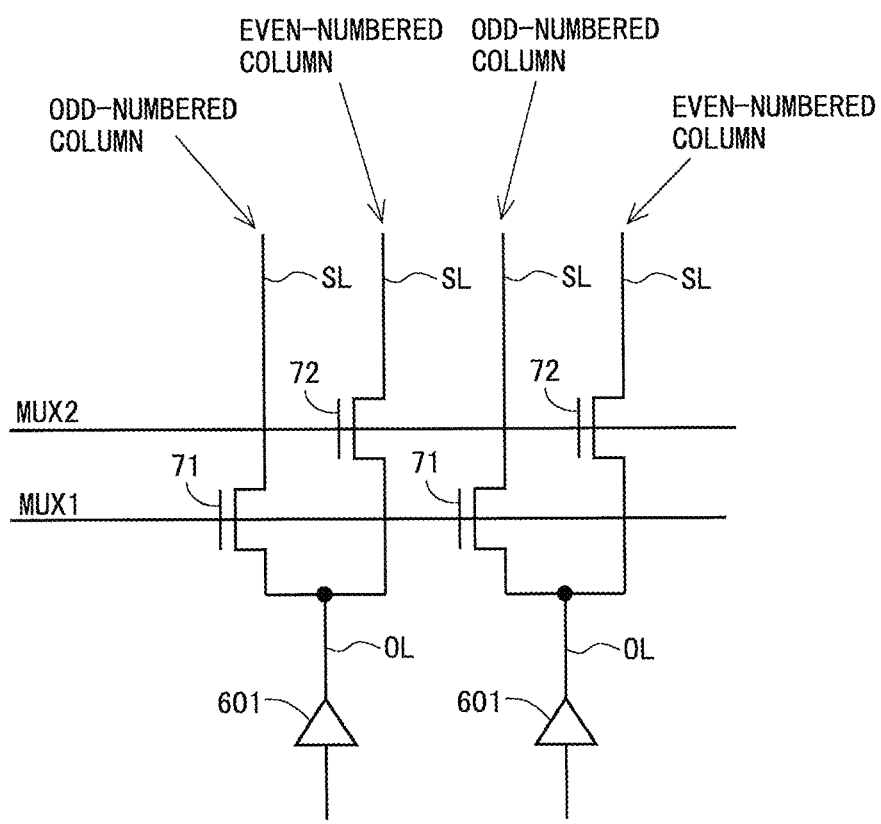
FIG. 26 is a circuit diagram showing a configuration of a part of the sampling switch circuit in the second embodiment.

FIG. 26 is a circuit diagram showing a configuration of a part of the sampling switch circuit 700. As shown in FIG. 26, in the present embodiment, two source bus lines SL are associated with one output signal line OL. A sampling TFT 71 whose on/off state is controlled by the first time-division control signal MUX1 is provided between a source bus line SL in an odd-numbered column and an output signal line OL. A sampling TFT 72 whose on/off state is controlled by the second time-division control signal MUX2 is provided between a source bus line SL in an even-numbered column and the output signal line OL. Note that although here description is made using an example in which NMOS thin-film transistors are adopted as the sampling TFTs 71 and 72, PMOS thin-film transistors or CMOS thin-film transistors can also be adopted.

When the first time-division control signal MUX1 is at a high level, the sampling TFT 71 goes into an on state. By this, a data voltage outputted to the output signal line OL from an output amplifier 601 in the output circuit 36 is applied to the source bus line SL in the odd-numbered column. When the second time-division control signal MUX2 is at a high level, the sampling TFT 72 goes into an on state. By this, a data voltage outputted to the output signal line OL from the output amplifier 601 in the output circuit 36 is applied to the source bus line SL in the even-numbered column.

Figure 27:
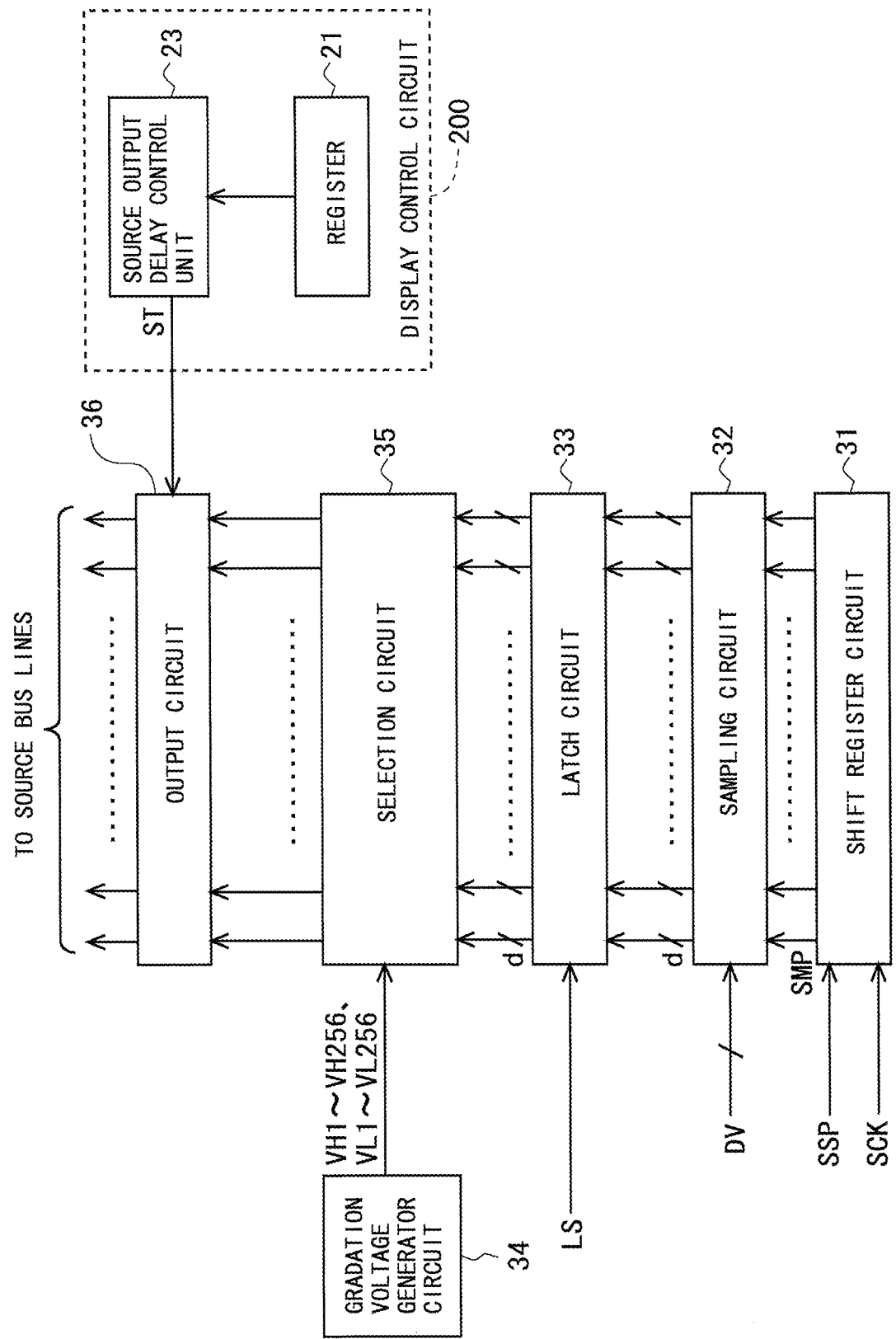
FIG. 27 is a block diagram showing a configuration for performing source output delay control (a configuration of the source driver and a configuration of a part of the display control circuit) in the second embodiment.

FIG. 27 is a block diagram showing a configuration for performing source output delay control (a configuration of the source driver 300 and a configuration of a part of the display control circuit 200). The display control circuit 200 is provided with a source output delay control unit 23 instead of the charge sharing control unit 22 (see FIG. 1) of the above-described first embodiment. In the present embodiment, an output control unit is implemented by this source output delay control unit 23. Note that as in the above-described first embodiment, in the register 21 in the display control circuit 200, there is stored in advance information that identifies source bus lines SL (or pixels or an area) whose charging rates are to be adjusted. Note also that as will be described later, information for determining the timing of change in the waveforms of various types of signals is also stored in the register 21 in advance. The source output delay control unit 23 outputs a source output control signal ST based on the information stored in the register 21 so that the output circuit 36 performs desired source output delay control. In other words, the source output delay control unit 23 controls the operation of the output circuit 36 (more specifically, the operation of the output amplifiers) such that by source output delay control, the application start timing of desired data voltages to source bus lines SL whose charging rates are to be adjusted among the plurality of source bus lines SL arranged in the display unit 510 is delayed relative to the application start timing of desired data voltages to source bus lines SL whose charging rates are not to be adjusted. In addition, unlike the above-described first embodiment, in the present embodiment, gradation voltages VH127 and VL127 are not provided to the output circuit 36 from the gradation voltage generator circuit 34.

Figure 28:
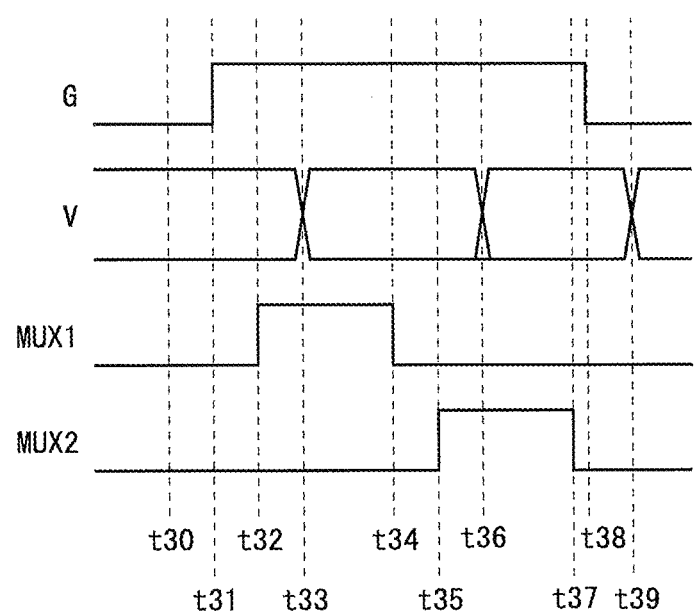
FIG. 28 is a waveform diagram for describing information saved in a register in the second embodiment.

Information for determining the timing of change in the waveforms of a scanning signal, data voltages, the first time-division control signal MUX1, the second time-division control signal MUX2, etc., is held in the register 21 in the display control circuit 200. Based on the information held in the register 21, the display control circuit 200 changes the waveforms of various types of signals. The register 21 holds, for example, information indicating the length of a period from a given reference point in time to a point in time when a scanning signal G rises (a period from point in time t30 to point in time t31 of FIG. 28), information indicating the length of a period from the point in time when the scanning signal G rises to a point in time when the scanning signal G falls (a period from point in time t31 to point in time t38 of FIG. 28), information indicating the length of a period from the given reference point in time to a point in time when the first time-division control signal MUX1 rises (a period from point in time t30 to point in time t32 of FIG. 28), information indicating the length of a period from the given reference point in time to a point in time when the levels of data voltages are changed (a period from point in time t30 to point in time t33 of FIG. 28) (or information indicating the length of a period from the point in time when the first time-division control signal MUX1 rises to the point in time when the levels of the data voltages are changed (a period from point in time t32 to point in time t33 of FIG. 28)), information indicating the length of a period from the point in time when the first time-division control signal MUX1 rises to a point in time when the first time-division control signal MUX1 falls (a period from point in time t32 to point in time t34 of FIG. 28), information indicating the length of a period from the point in time when the first time-division control signal MUX1 falls to a point in time when the second time-division control signal MUX2 rises (a period from point in time t34 to point in time t35 of FIG. 28), information indicating the length of a period from the point in time when the levels of the data voltages are changed for the first time during a horizontal scanning period to a point in time when the levels of the data voltages are changed next (a period from point in time t33 to point in time t36 of FIG. 28), information indicating the length of a period from the point in time when the second time-division control signal MUX2 rises to a point in time when the second time-division control signal MUX2 falls (a period from point in time t35 to point in time t37 of FIG. 28), and information indicating the length of a period from the point in time when the scanning signal G falls to a point in time when the levels of the data voltages are changed (a period from point in time t38 to point in time t39 of FIG. 28).

2.3 Drive Method

Next, a drive method of the present embodiment will be described. As described above, information indicating the length of a period from a given reference point in time to a point in time when the levels of data voltages are changed (or information indicating the length of a period from a point in time when the first time-division control signal MUX1 rises to the point in time when the levels of the data voltages are changed) is held in the register 21 in the display control circuit 200. In the present embodiment, regarding data voltages to be applied to source bus lines SL whose charging rates are to be adjusted, a change in level (a change in the level of the data voltage outputted from the output amplifier) is made after a lapse of a predetermined period which is determined in advance from a point in time determined based on the information held in the register 21 (an original point in time when the level of the data voltage is changed). In other words, regarding the source bus lines SL whose charging rates are to be adjusted, desired data voltages are applied at timing delayed by a predetermined period from the original timing. In the present embodiment, such source output delay control is performed. Note that the charging rate may be adjusted by making the point in time when the level of a time-division control signal changes different from the original point in time, or making the length of a period from a point in time when the time-division control signal rises to a point in time when the time-division control signal falls different from the original length of the period.

Specifically, in the present embodiment, too, the source bus lines SL arranged in the area Ar2 (see FIG. 4) are to be adjusted in their charging rates, and regarding the source bus lines SL arranged in the area Ar2, the application of desired data voltages starts at timing delayed by a predetermined period relative to that for the source bus lines SL arranged in the area Ar1 and the source bus lines SL arranged in the area Ar3.

Figure 29:
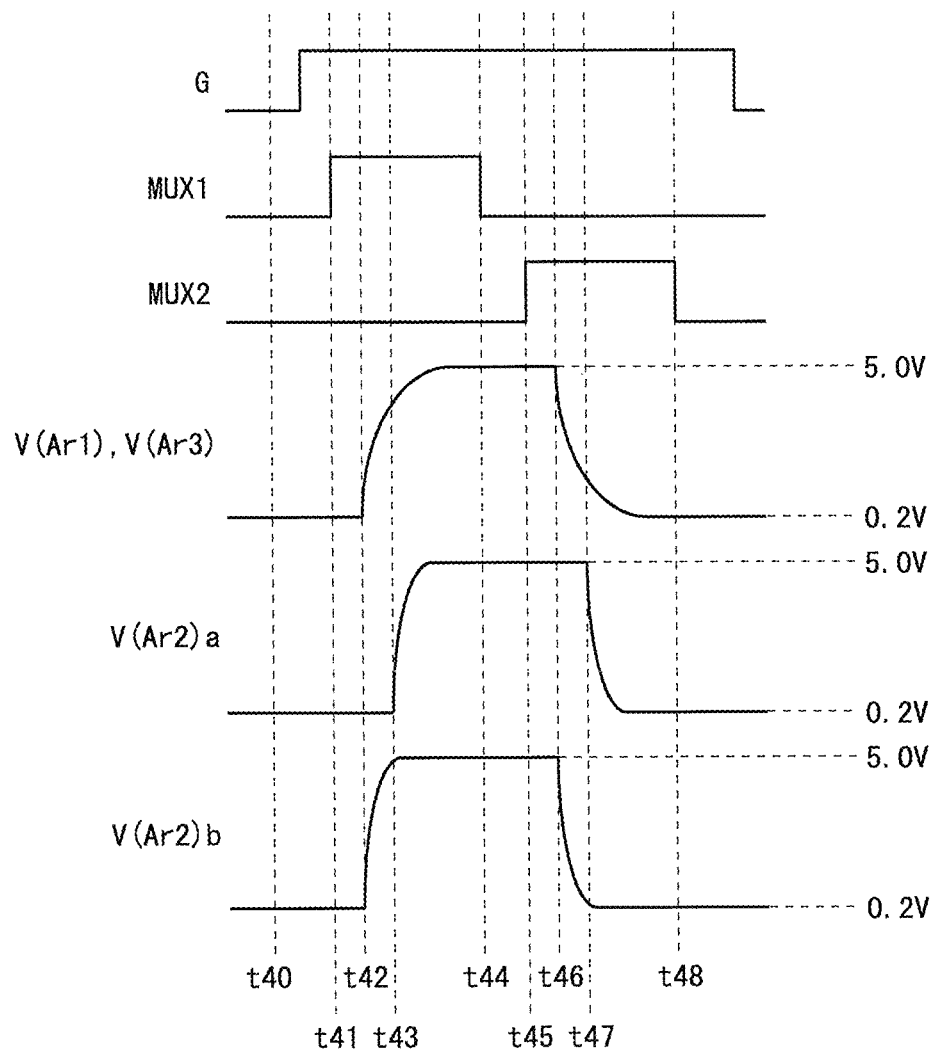
FIG. 29 is a waveform diagram showing an example of changes in source voltage for when a data voltage changes between 0.2 V and 5.0 V during a given horizontal scanning period in a given frame in the second embodiment.

FIG. 29 is a waveform diagram showing an example of changes in source voltage for when a data voltage changes between 0.2 V and 5.0 V during a given horizontal scanning period in a given frame. In the example shown in FIG. 29, a period from a reference point in time to a point in time when the level of a data voltage is changed is a comparatively short period (a period from point in time t40 to point in time t42) for the area Ar1 and the area Ar3, whereas the period is a comparatively long period (a period from point in time t40 to point in time t43) for the area Ar2. In addition, along with this, a period from a point in time when the second time-division control signal MUX2 rises to a point in time when the level of the data voltage is changed is also a comparatively short period (a period from point in time t45 to point in time t46) for the area Ar1 and the area Ar3, whereas the period is a comparatively long period (a period from point in time t45 to point in time t47) for the area Ar2. As such, in the area Ar2, the application of desired data voltages to the source bus lines SL starts at timing delayed by a predetermined period relative to that for the area Ar1 and the area Ar3.

Here, when a waveform indicated by reference character V(Ar2)a is compared with a waveform indicated by reference character V(Ar2)b in FIG. 29, it can be grasped that regarding the source bus lines SL arranged in the area Ar2, by source output delay control such as that described above, the settling time of the data voltages with the reference point in time (or a point in time when the time-division control signal rises) as a reference becomes longer than the original settling time.

Note that in the example shown in FIG. 29, a period from point in time t42 to point in time t44 and a period from point in time t46 to point in time t48 correspond to data voltage application periods, a period from point in time t42 to point in time t43 and a period from point in time t46 to point in time t47 correspond to adjustment periods, and a period from point in time t43 to point in time t44 and a period from point in time t47 to point in time t48 correspond to all-line charging periods. That is, during an adjustment period, desired data voltages are applied to source bus lines SL whose charging rates are not to be adjusted and voltages having been applied, immediately before starting the adjustment period, to source bus lines SL whose charging rates are to be adjusted are applied as they are to the source bus lines SL, and during an all-line charging period, desired data voltages are applied to all source bus lines SL.

2.4 Effects

According to the present embodiment, the display control circuit 200 is provided with the register 21 that stores information identifying source bus lines SL whose charging rates are to be adjusted; and the source output delay control unit 23 that outputs a source output control signal ST to the output circuit 36 based on the information stored in the register 21. Then, based on the source output control signal ST, the output circuit 36 in the source driver 300 delays the application start timing of desired data voltages to the source bus lines SL whose charging rates are to be adjusted, by a predetermined period relative to the application start timing of desired data voltages to source bus lines SL whose charging rates are not to be adjusted. Here, by setting source bus lines SL with small load as target of adjusting charging rate, the settling time of data voltages on the source bus lines SL with small load can be made longer than the original settling time. By this, differences in the settling time of data voltages between the plurality of source bus lines SL are reduced. As a result, a uniform charging rate is achieved across the entire display unit 510, suppressing the occurrence of abnormal display (display of an image called vertical gradation).

As described above, according to the present embodiment, as in the above-described first embodiment, a liquid crystal display device is implemented that can suppress the occurrence of abnormal display caused by the "differences in the settling time of data voltages (to be applied to the source bus lines SL)" between the positions of the source bus lines SL.

2.5 Variant

Figure 30:
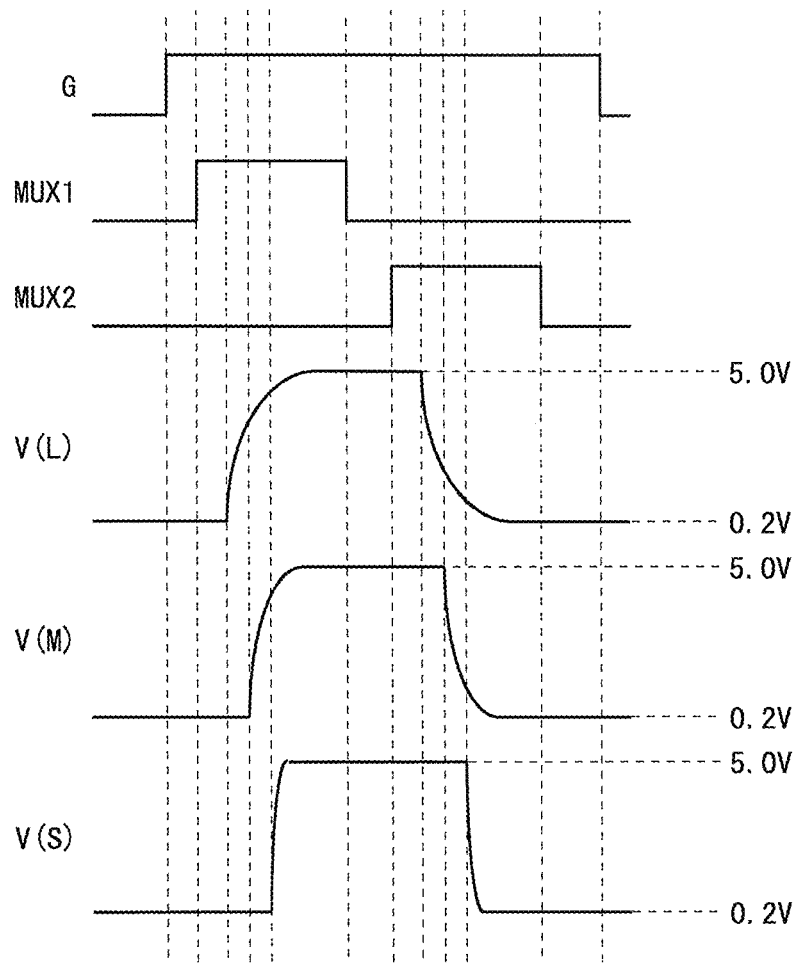
FIG. 30 is a waveform diagram showing an example of changes in source voltage for when a data voltage changes between 0.2 V and 5.0 V during a given horizontal scanning period in a given frame in a variant of the second embodiment.

Although the application start timing of desired data voltages to the source bus lines SL is controlled in two steps in the above-described second embodiment, the present invention is not limited thereto. As in the third variant of the above-described first embodiment, the control can also be performed in three or more steps. For example, when there are three types of areas (an area with small load, an area with medium load, and an area with large load), the above-described source output delay control may be performed such that, as shown in FIG. 30, the application of desired data voltages to source bus lines SL starts at original timing regarding the area with large load, the application of desired data voltages to source bus lines SL starts at timing delayed a bit relative to the original timing regarding the area with medium load, and the application of desired data voltages to source bus lines SL starts at timing delayed greatly relative to the original timing regarding the area with small load. Note that, in FIG. 30, a source voltage for the source bus line SL arranged in the area with large load is indicated by reference character V(L), a source voltage for the source bus line SL arranged in the area with medium load is indicated by reference character V(M), and a source voltage for the source bus line SL arranged in the area with small load is indicated by reference character V(S).

In the present variant, when taking a look at only source bus lines SL whose charging rates are to be adjusted, the source bus lines SL are divided into two groups (a group corresponding to an area with small load and a group corresponding to an area with large load). However, the source bus lines SL whose charging rates are to be adjusted can also be divided into three or more groups. By thus dividing the source bus lines SL whose charging rates are to be adjusted into multiple groups as appropriate, it becomes possible to more minutely adjust the charging rates. By this, the occurrence of abnormal display is more effectively suppressed.

3. Third Embodiment

3.1 Overview

In the above-described first embodiment, the charging rates are adjusted by charge sharing control in which predetermined voltages different from data voltages are applied to source bus lines SL. In addition, in the above-described second embodiment, the charging rates are adjusted by source output delay control in which the timing of outputting desired data voltages from the output amplifiers 601 to 603 is adjusted. In contrast, in the present embodiment, to adjust the charging rates, both charge sharing control and source output delay control are performed. Note that, unlike the above-described second embodiment, time-division driving is not adopted.

3.2 Configuration

The overall configuration of a liquid crystal display device according to the present embodiment is the same as that of the above-described first embodiment (see FIG. 2). Note, however, that as in the above-described second embodiment, a source output control signal ST is also transmitted to the source driver 300 from the display control circuit 200.

Figure 31:
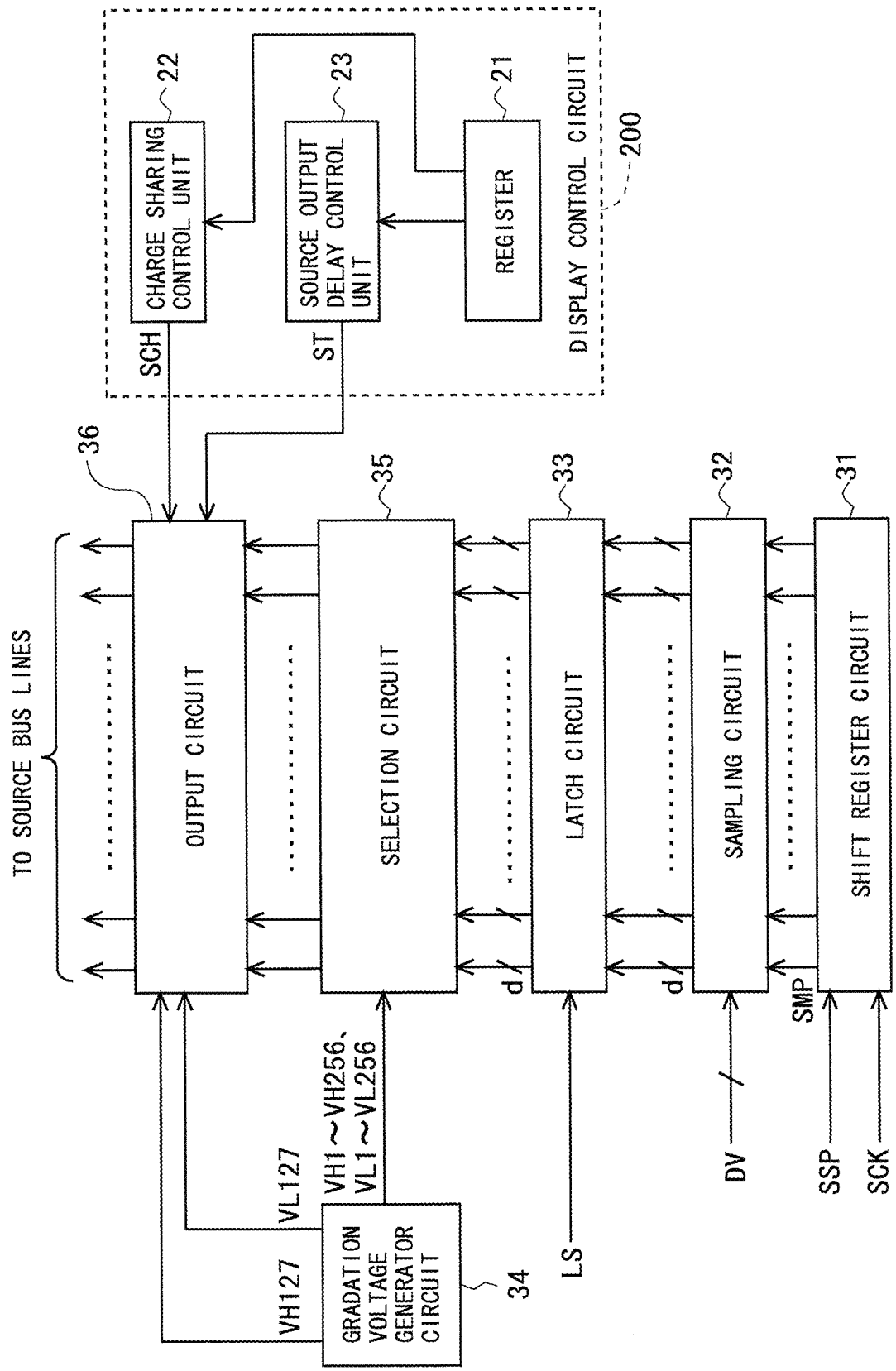
FIG. 31 is a block diagram showing a configuration for performing charge sharing control and source output delay control (a configuration of the source driver and a configuration of a part of the display control circuit) in a third embodiment of the present invention.

FIG. 31 is a block diagram showing a configuration for performing charge sharing control and source output delay control (a configuration of the source driver 300 and a configuration of a part of the display control circuit 200). As in the above-described first embodiment, the source driver 300 is composed of the shift register circuit 31, the sampling circuit 32, the latch circuit 33, the gradation voltage generator circuit 34, the selection circuit 35, and the output circuit 36. In addition, as in the above-described first embodiment, the gradation voltage generator circuit 34 provides a gradation voltage group VH1 to VH256 and VL1 to VL256 to the selection circuit 35, and provides positive-polarity and negative-polarity gradation voltages VH127 and VL127 corresponding to the gradation value "127" (the gradation value at the intermediate level) to the output circuit 36.

As shown in FIG. 31, the display control circuit 200 includes the register 21, the charge sharing control unit 22, and the source output delay control unit 23. In the register 21, there are stored in advance information that identifies source bus lines SL (or pixels or an area) whose charging rates are to be adjusted by charge sharing control, and information for determining the timing of change in the waveforms of various types of signals. The charge sharing control unit 22 outputs charge sharing control signals SCH based on the information stored in the register 21 so that the output circuit 36 performs desired charge sharing control. The source output delay control unit 23 outputs a source output control signal ST based on the information stored in the register 21 so that the output circuit 36 performs desired source output delay control. Note that in the present embodiment, an output control unit is implemented by the charge sharing control unit 22 and the source output delay control unit 23.

3.3 Drive Method

Next, a drive method of the present embodiment will be described. In the present embodiment, a period for charging the source bus lines SL (data voltage application period) includes a first adjustment period during which source output delay control is performed to adjust the charging rates; a second adjustment period during which charge sharing control is performed to adjust the charging rates; and an all-line charging period during which desired data voltages are applied to all source bus lines SL. During the first adjustment period, voltages having been applied, immediately before starting the first adjustment period, to source bus lines SL whose charging rates are to be adjusted are applied as they are to the source bus lines SL. During the second adjustment period, a predetermined voltage (a gradation voltage VH127 or VL127) different from data voltages is applied to the source bus lines SL whose charging rates are to be adjusted. Then, the application of desired data voltages to the source bus lines SL whose charging rates are to be adjusted starts in the all-line charging period following the second adjustment period.

Figure 32:
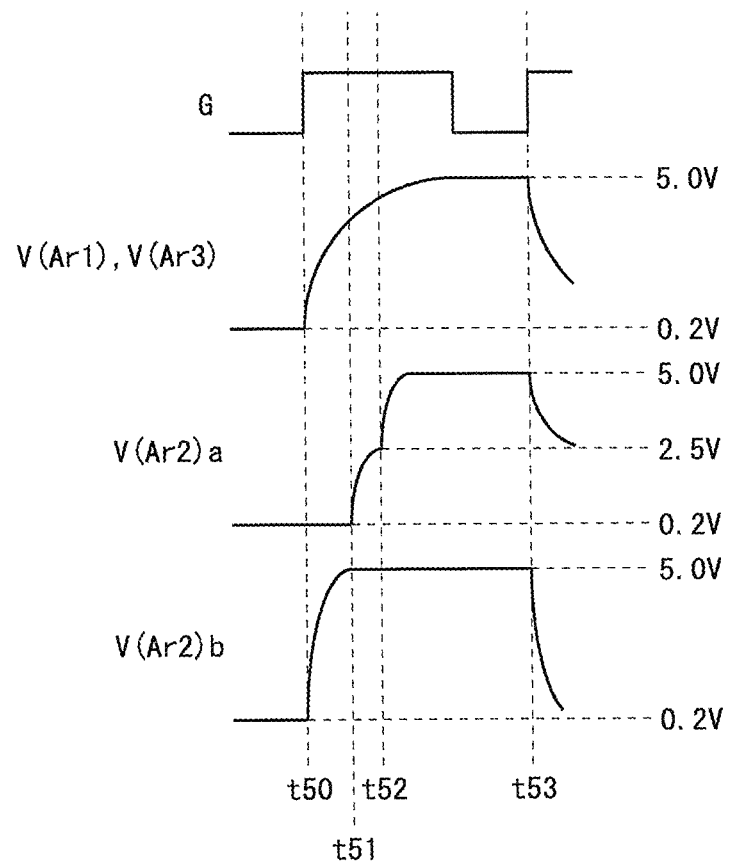
FIG. 32 is a waveform diagram showing an example of changes in source voltage for when a data voltage changes from 0.2 V to 5.0 V during a given horizontal scanning period in a given frame in the third embodiment.

FIG. 32 is a waveform diagram showing an example of changes in source voltage for when a data voltage changes from 0.2 V to 5.0 V during a given horizontal scanning period in a given frame. In the example shown in FIG. 32, a period from point in time t50 to point in time t51 is a first adjustment period, a period from point in time t51 to point in time t52 is a second adjustment period, and a period from point in time t52 to point in time t53 is an all-line charging period.

In the area Ar1 and the area Ar3, the application of desired data voltages to the source bus lines SL starts at point in time t50 (the start point in time of the first adjustment period), and the desired data voltages are applied to the source bus lines SL throughout the first adjustment period, the second adjustment period, and the all-line charging period. Therefore, as shown in FIG. 32, after point in time t50, the source voltages gradually change toward a target voltage (5.0 V). Then, the source voltages reach the target voltage (5.0 V) at some point in time of the all-line charging period.

On the other hand, in the area Ar2, during the first adjustment period, voltages having been applied to the source bus lines SL immediately before starting the first adjustment period are applied as they are to the source bus lines SL. Therefore, the source voltage in the area Ar2 at point in time t51 (the end point in time of the first adjustment period) is 0.2 V. In the area Ar2, during the second adjustment period, the gradation voltage VH127 is applied to the source bus lines SL. Therefore, in the area Ar2, the source voltages reach only 2.5 V at the end point in time of the second adjustment period. Then, the application of desired data voltages to the source bus lines SL starts at point in time t52 (the end point in time of the second adjustment period, i.e., the start point in time of the all-line charging period). By this, the source voltages reach the target voltage (5.0 V) at some point in time of the all-line charging period.

Here, when a waveform indicated by reference character V(Ar2)a is compared with a waveform indicated by reference character V(Ar2)b in FIG. 32, it can be grasped that regarding the source bus line SL arranged in the area Ar2, by providing a first adjustment period during which source output delay control such as that described above is performed and a second adjustment period during which charge sharing control such as that described above is performed, the settling time of the data voltages becomes longer than the original settling time.

3.4 Effects

According to the present embodiment, during each horizontal scanning period, to source bus lines SL whose charging rates are to be adjusted, first, a gradation voltage corresponding to the gradation value at the intermediate level is applied at timing delayed by a predetermined period from the original application start timing of data voltages. Then, to the source bus lines SL whose charging rates are to be adjusted, desired data voltages are applied after the gradation voltage is applied for a certain period. Here, by setting source bus lines SL with small load as target of adjusting charging rate, the settling time of data voltages on the source bus line SL with small load can be effectively made longer than the original settling time. In addition, since two types of control (source output delay control and charge sharing control) are performed, it becomes possible to more minutely adjust the charging rate. By the above, according to the present embodiment, a liquid crystal display device is implemented that can more effectively suppress the occurrence of abnormal display caused by the "differences in the settling time of data voltages (to be applied to the source bus lines SL)" between the positions of the source bus lines SL.

3.5 Variant

A configuration in which both source output delay control and charge sharing control are performed to adjust the charging rates of source bus lines SL can also be applied to a liquid crystal display device adopting time-division driving (see the above-described second embodiment), which will be described below.

In the present variant, as in the above-described second embodiment, the sampling switch circuit 700 is provided between the source driver 300 and the display unit 510 (see FIGS. 24 to 26). Based on time-division control signals transmitted to the sampling switch circuit 700 from the display control circuit 200, in the first half of each horizontal scanning period, data voltages are applied to source bus lines SL in the odd-numbered columns, and in the second half of each horizontal scanning period, data voltages are applied to source bus lines SL in the even-numbered columns.

Figure 33:
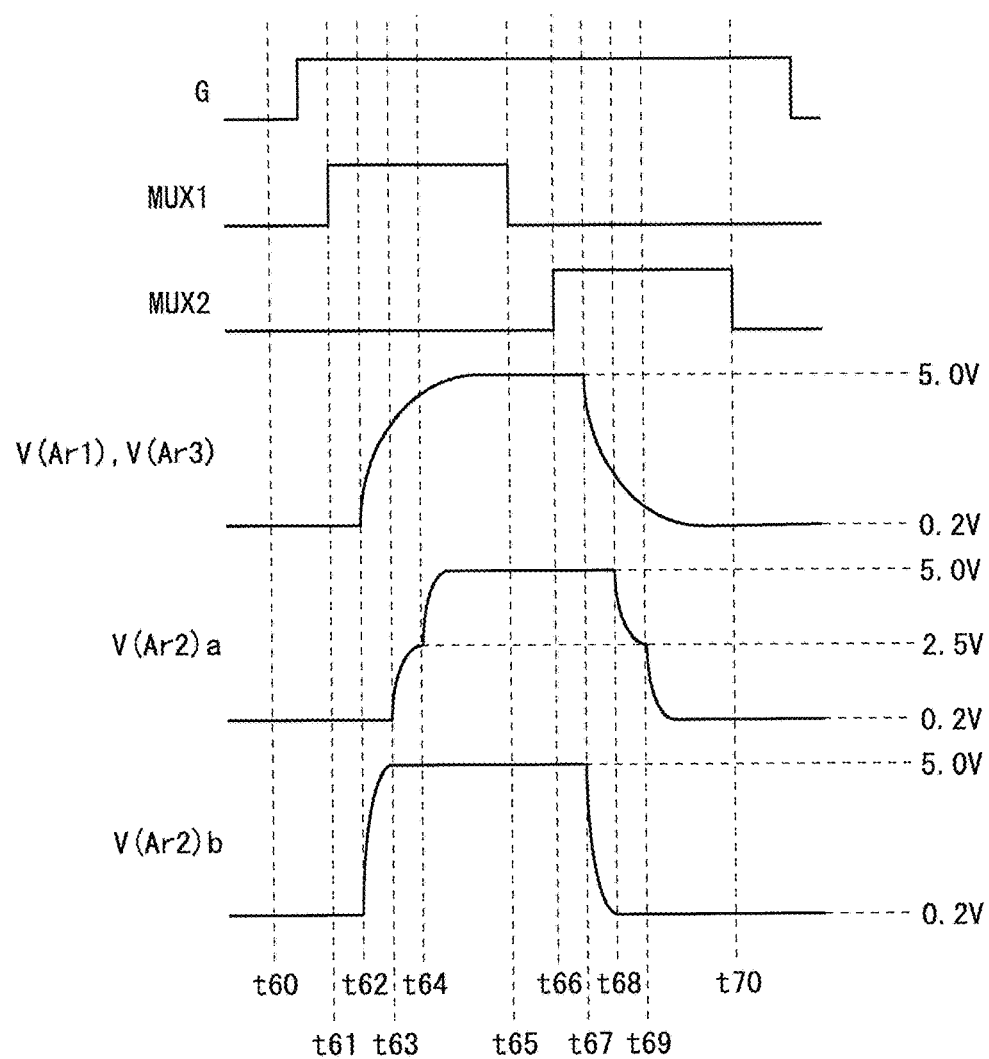
FIG. 33 is a waveform diagram showing an example of changes in source voltage for when a data voltage changes between 0.2 V and 5.0 V during a given horizontal scanning period in a given frame in a variant of the third embodiment.

FIG. 33 is a waveform diagram showing an example of changes in source voltage for when a data voltage changes between 0.2 V and 5.0 V during a given horizontal scanning period in a given frame. In the example shown in FIG. 33, a period from point in time t62 to point in time t63 and a period from point in time t67 to point in time t68 are first adjustment periods, a period from point in time t63 to point in time t64 and a period from point in time t68 to point in time t69 are second adjustment periods, and a period from point in time t64 to point in time t65 and a period from point in time t69 to point in time t70 are all-line charging periods.

As can be grasped from FIG. 33, a period from a reference point in time to a point in time when the level of a data voltage is changed is a comparatively short period (a period from point in time t60 to point in time t62) for the area Ar1 and the area Ar3, whereas the period is a comparatively long period (a period from point in time t60 to point in time t63) for the area Ar2. In addition, along with this, a period from a point in time when the second time-division control signal MUX2 rises to a point in time when the level of the data voltage is changed is also a comparatively short period (a period from point in time t66 to point in time t67) for the area Ar1 and the area Ar3, whereas the period is a comparatively long period (a period from point in time t66 to point in time t68) for the area Ar2. As such, in the area Ar2, a change in source voltage starts at timing delayed by a predetermined period relative to that of the area Ar1 and the area Ar3.

In the area Ar1 and the area Ar3, in the first half of the horizontal scanning period, the application of desired data voltages to the source bus lines SL starts at point in time t62 (the start point in time of the first adjustment period), and the desired data voltages are applied to the source bus lines SL throughout the first adjustment period, the second adjustment period, and the all-line charging period. Therefore, as shown in FIG. 33, after point in time t62, the source voltages gradually change toward a target voltage (5.0 V). Then, the source voltages reach the target voltage (5.0 V) at some point in time of the all-line charging period. The same operation is also performed in the second half of the horizontal scanning period.

On the other hand, in the area Ar2, in the first half of the horizontal scanning period, during the first adjustment period, voltages having been applied to the source bus lines SL immediately before starting the first adjustment period are applied as they are to the source bus lines SL. Therefore, the source voltage in the area Ar2 at point in time t63 (the end point in time of the first adjustment period) is 0.2 V. In the area Ar2, during the second adjustment period, the gradation voltage VH127 is applied to the source bus lines SL. Therefore, in the area Ar2, the source voltages reach only 2.5 V at the end point in time of the second adjustment period. Then, the application of desired data voltages to the source bus lines SL starts at point in time t64 (the end point in time of the second adjustment period, i.e., the start point in time of the all-line charging period). By this, the source voltages reach the target voltage (5.0 V) at some point in time of the all-line charging period. The same operation is also performed in the second half of the horizontal scanning period.

Here, when a waveform indicated by reference character V(Ar2)a is compared with a waveform indicated by reference character V(Ar2)b in FIG. 33, it can be grasped that regarding the source bus line SL arranged in the area Ar2, as in the above-described third embodiment, by providing a first adjustment period during which source output delay control such as that described above is performed and a second adjustment period during which charge sharing control such as that described above is performed, the settling time of the data voltages becomes longer than the original settling time. Thus, differences in the settling time of data voltages between the plurality of source bus lines SL are reduced. As a result, a uniform charging rate is achieved across the entire display unit 510, suppressing the occurrence of abnormal display (display of an image called vertical gradation).

4. Others

The present invention is not limited to the above-described embodiments (including the variants) and can be implemented by making various modifications thereto without departing from the spirit thereof.

Figure 34:
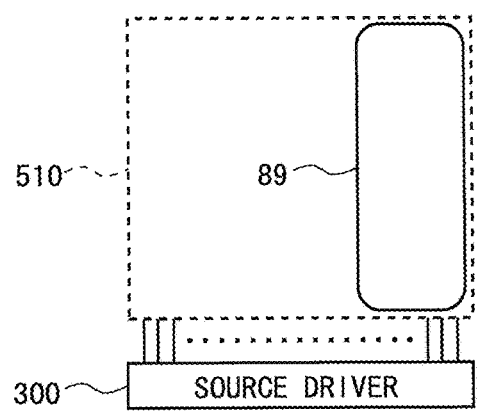
FIG. 34 is a diagram for describing a case in which the present invention is applied to a liquid crystal display device having a general rectangular display unit.
Figure 35:
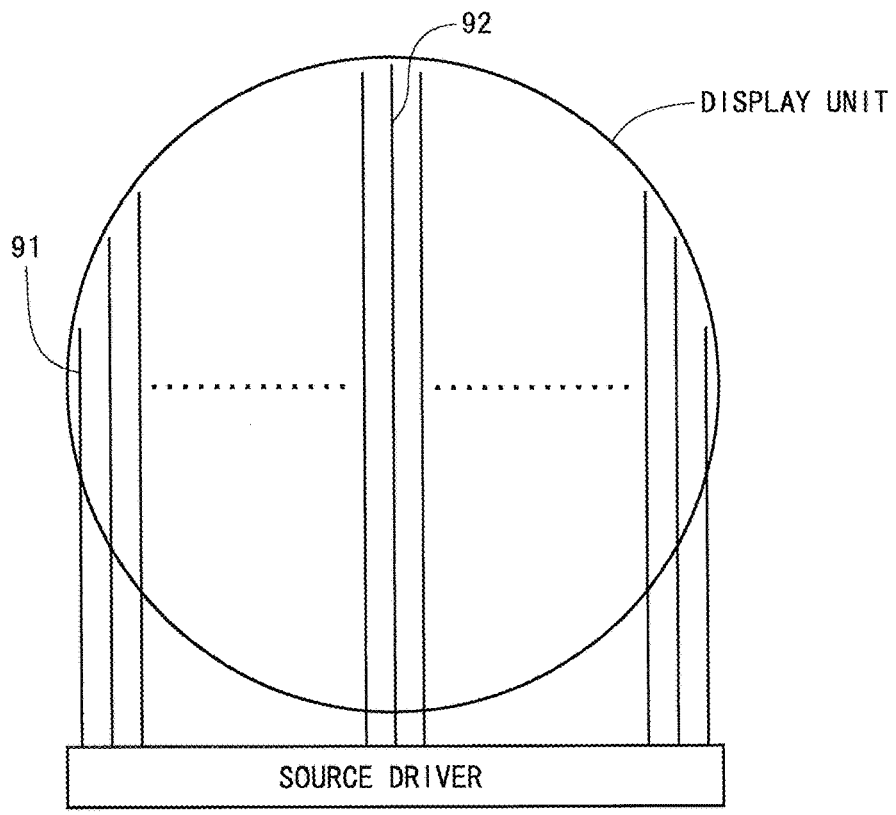
FIG. 35 is a diagram schematically showing source bus lines, a display unit, and a source driver of an oddly-shaped display having a circular display unit, regarding conventional art.
Figure 36:
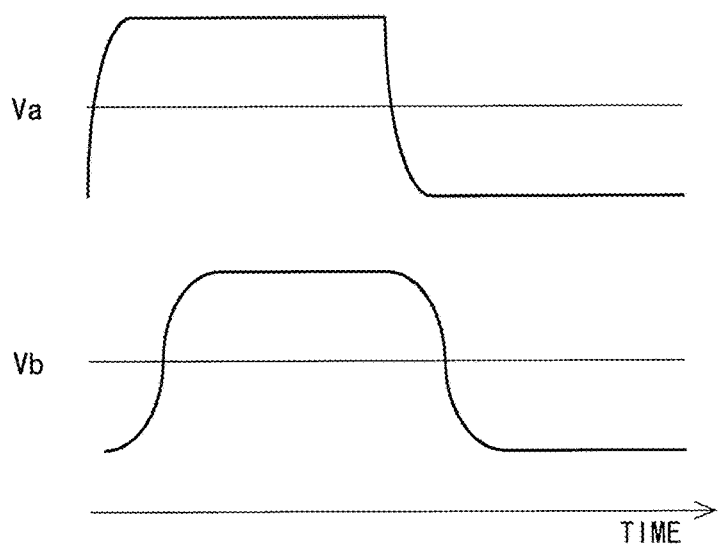
FIG. 36 is a signal waveform diagram for describing a difference in the settling time of data voltages between the positions of source bus lines, regarding the conventional art.

For example, although it is premised that a liquid crystal display device is an oddly-shaped display in the above-described embodiments (including the variants), the present invention is not limited thereto. The present invention can also be applied to a liquid crystal display device having a general rectangular display unit, which will be described with reference to FIG. 34. FIG. 34 only shows the source driver 300 and the display unit 510 among the components shown in FIG. 2, etc. Here, it is assumed that when a so-called solid image is displayed without performing the above-described charge sharing control or the above-described source output delay control, the luminance of a region indicated by reference character 89 in FIG. 34 is lower than that of the other region. In such a case, the above-described charge sharing control or the above-described source output delay control may be performed on source bus lines SL in the other region than the region indicated by reference character 89. By this, the luminance of the other region than the region indicated by reference character 89 becomes lower than its original luminance. In this manner, by applying the present invention to a liquid crystal display device having a general rectangular display unit, the occurrence of luminance non-uniformity can be suppressed.

This application claims priority to Japanese Patent Application No. 2017-15205, entitled "Display Device and Drive Method therefor", filed on Jan. 31, 2017, the content of which is incorporated herein by reference.

DESCRIPTION OF REFERENCE CHARACTERS

21: REGISTER
22: CHARGE SHARING CONTROL UNIT

23: SOURCE OUTPUT DELAY CONTROL UNIT
34: GRADATION VOLTAGE GENERATOR CIRCUIT
36: OUTPUT CIRCUIT
200: DISPLAY CONTROL CIRCUIT
300: SOURCE DRIVER (VIDEO SIGNAL LINE DRIVE CIRCUIT)
400: GATE DRIVER (SCANNING SIGNAL LINE DRIVE CIRCUIT)
500: LIQUID CRYSTAL PANEL
510: DISPLAY UNIT
601 to 603: OUTPUT AMPLIFIER
621 to 623, 631 to 633, and 641 to 643: SWITCH
700: SAMPLING SWITCH CIRCUIT
GL(1) to GL(i): GATE BUS LINE
SL(1) to SL(j): SOURCE BUS LINE
SCH: CHARGE SHARING CONTROL SIGNAL
ST: SOURCE OUTPUT CONTROL SIGNAL

The invention claimed is:

1. A display device that has a display unit in which a plurality of video signal lines are arranged, and displays an image created based on input image data on the display unit, the display device comprising:
   a video signal line drive circuit including an output circuit configured to apply data voltages generated based on the input image data to the plurality of video signal lines; and
   an output control unit configured to control operation of the output circuit such that application start timing of desired data voltages to control-target video signal lines is delayed relative to application start timing of desired data voltages to video signal lines other than the control-target video signal lines, the control-target video signal lines being specified video signal lines among the plurality of video signal lines, wherein
   the display unit has a non-rectangular shape, and
   video signal lines with a comparatively short length among the plurality of video signal lines are specified as the control-target video signal lines.

2. The display device according to claim 1, wherein
   a data voltage application period includes an adjustment period and an all-line charging period, the data voltage application period being a period during which application of the data voltages to video signal lines is performed, and the all-line charging period being a period following the adjustment period,
   the output circuit is configured to selectively output the data voltages and a predetermined voltage other than the data voltages, and
   the output control unit controls the operation of the output circuit such that during the adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

3. The display device according to claim 2, wherein
   the control-target video signal lines are divided into N (N is an integer greater than or equal to 2) groups,
   as the adjustment period, N adjustment periods having same start timing and different end timings are prepared for the N groups, respectively, and
   the output control unit controls the operation of the output circuit such that the predetermined voltage is applied to control-target video signal lines included in any group during an adjustment period corresponding to relevant group.

4. The display device according to claim 2, wherein
   the video signal line drive circuit further includes a gradation voltage generator circuit configured to generate a gradation voltage group including a plurality of gradation voltages from which the data voltages are originated, and
   one or more gradation voltages included in the gradation voltage group are provided as the predetermined voltage to the output circuit from the gradation voltage generator circuit.

5. The display device according to claim 1, wherein
   a data voltage application period includes an adjustment period and an all-line charging period, the data voltage application period being a period during which application of the data voltages to video signal lines is performed, and the all-line charging period being a period following the adjustment period, and
   the output control unit controls the operation of the output circuit such that during the adjustment period the desired data voltages are applied to the video signal lines other than the control-target video signal lines and voltages applied to the control-target video signal lines immediately before starting the adjustment period are applied as they are to the control-target video signal lines, and during the all-line charging period the desired data voltages are applied to all of the plurality of video signal lines.

6. The display device according to claim 5, wherein
   the control-target video signal lines are divided into N (N is an integer greater than or equal to 2) groups,
   as the adjustment period, N adjustment periods having same start timing and different end timings are prepared for the N groups, respectively, and
   the output control unit controls the operation of the output circuit such that to control-target video signal lines included in any group, during an adjustment period corresponding to relevant group, the voltages applied to the control-target video signal lines immediately before starting the adjustment period are applied as they are.

7. The display device according to claim 1, wherein
   a data voltage application period includes a first adjustment period, a second adjustment period, and an all-line charging period, the data voltage application period being a period during which application of the data voltages to video signal lines is performed, the second adjustment period being a period following the first adjustment period, and the all-line charging period being a period following the second adjustment period,
   the output circuit is configured to selectively output the data voltages and a predetermined voltage other than the data voltages, and
   the output control unit controls the operation of the output circuit such that during the first adjustment period the desired data voltages are applied to the video signal lines other than the control-target video signal lines and voltages applied to the control-target video signal lines immediately before starting the first adjustment period are applied as they are to the control-target video signal lines, during the second adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

8. A display device that has a display unit in which a plurality of video signal lines are arranged, and displays an image created based on input image data on the display unit, the display device comprising:
- a video signal line drive circuit including an output circuit configured to apply data voltages generated based on the input image data to the plurality of video signal lines;
- an output control unit configured to control operation of the output circuit such that application start timing of desired data voltages to control-target video signal lines is delayed relative to application start timing of desired data voltages to video signal lines other than the control-target video signal lines, the control-target video signal lines being specified video signal lines among the plurality of video signal lines; and
- a register configured to hold information identifying the control-target video signal lines, wherein
- the output control unit controls the operation of the output circuit based on the information held in the register.

9. A display device that has a display unit in which a plurality of video signal lines are arranged, and displays an image created based on input image data on the display unit, the display device comprising:
- a video signal line drive circuit including an output circuit configured to apply data voltages generated based on the input image data to the plurality of video signal lines; and
- an output control unit configured to control operation of the output circuit such that application start timing of desired data voltages to control-target video signal lines is delayed relative to application start timing of desired data voltages to video signal lines other than the control-target video signal lines, the control-target video signal lines being specified video signal lines among the plurality of video signal lines, wherein
- the display unit is logically divided into a plurality of areas, and
- the output control unit controls the operation of the output circuit such that an amount of delay in application start timing of the desired data voltages is larger for an area with smaller load on video signal lines.

10. The display device according to claim 9, wherein
a data voltage application period includes an adjustment period and an all-line charging period, the data voltage application period being a period during which application of the data voltages to video signal lines is performed, and the all-line charging period being a period following the adjustment period,
the output circuit is configured to selectively output the data voltages and a predetermined voltage other than the data voltages, and
the output control unit controls the operation of the output circuit such that during the adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

11. The display device according to claim 10, wherein
the control-target video signal lines are divided into N (N is an integer greater than or equal to 2) groups,
as the adjustment period, N adjustment periods having same start timing and different end timings are prepared for the N groups, respectively, and
the output control unit controls the operation of the output circuit such that the predetermined voltage is applied to control-target video signal lines included in any group during an adjustment period corresponding to relevant group.

12. The display device according to claim 10, wherein
the video signal line drive circuit further includes a gradation voltage generator circuit configured to generate a gradation voltage group including a plurality of gradation voltages from which the data voltages are originated, and
one or more gradation voltages included in the gradation voltage group are provided as the predetermined voltage to the output circuit from the gradation voltage generator circuit.

13. The display device according to claim 9, wherein
a data voltage application period includes an adjustment period and an all-line charging period, the data voltage application period being a period during which application of the data voltages to video signal lines is performed, and the all-line charging period being a period following the adjustment period, and
the output control unit controls the operation of the output circuit such that during the adjustment period the desired data voltages are applied to the video signal lines other than the control-target video signal lines and voltages applied to the control-target video signal lines immediately before starting the adjustment period are applied as they are to the control-target video signal lines, and during the all-line charging period the desired data voltages are applied to all of the plurality of video signal lines.

14. The display device according to claim 13, wherein
the control-target video signal lines are divided into N (N is an integer greater than or equal to 2) groups,
as the adjustment period, N adjustment periods having same start timing and different end timings are prepared for the N groups, respectively, and
the output control unit controls the operation of the output circuit such that to control-target video signal lines included in any group, during an adjustment period corresponding to relevant group, the voltages applied to the control-target video signal lines immediately before starting the adjustment period are applied as they are.

15. The display device according to claim 9, wherein
a data voltage application period includes a first adjustment period, a second adjustment period, and an all-line charging period, the data voltage application period being a period during which application of the data voltages to video signal lines is performed, the second adjustment period being a period following the first adjustment period, and the all-line charging period being a period following the second adjustment period,
the output circuit is configured to selectively output the data voltages and a predetermined voltage other than the data voltages, and
the output control unit controls the operation of the output circuit such that during the first adjustment period the desired data voltages are applied to the video signal lines other than the control-target video signal lines and voltages applied to the control-target video signal lines immediately before starting the first adjustment period are applied as they are to the control-target video signal lines, during the second adjustment period the desired data voltages are applied to the video signal lines other than the control-target video signal lines and the predetermined voltage is applied to the control-target video signal lines, and during the all-line charging period the desired data voltages are applied to all of the plurality of video signal lines.

\* \* \* \* \*